US008897126B2

(12) United States Patent
Nishioka et al.

(10) Patent No.: US 8,897,126 B2
(45) Date of Patent: Nov. 25, 2014

(54) COMMUNICATION APPARATUS, APPARATUS ACTIVATION CONTROL METHOD, COMMUNICATION CONTROL METHOD, AND COMMUNICATION CONTROL PROGRAM

(75) Inventors: Itaru Nishioka, Tokyo (JP); Toshimitsu Kashima, Tokyo (JP); Masakatsu Yanagisawa, Tokyo (JP); Makoto Kawamichi, Tokyo (JP)

(73) Assignee: NEC Corporation, Tokyo (JP)

( * ) Notice: Subject to any disclaimer, the term of this patent is extended or adjusted under 35 U.S.C. 154(b) by 1564 days.

(21) Appl. No.: 12/095,704

(22) PCT Filed: Nov. 17, 2006

(86) PCT No.: PCT/JP2006/322919
§ 371 (c)(1),
(2), (4) Date: May 30, 2008

(87) PCT Pub. No.: WO2007/063716
PCT Pub. Date: Jun. 7, 2007

(65) Prior Publication Data
US 2010/0290778 A1 Nov. 18, 2010

(30) Foreign Application Priority Data
Dec. 2, 2005 (JP) ................................. 2005-349890

(51) Int. Cl.
*H04L 12/26* (2006.01)
*H04L 12/721* (2013.01)
*H04L 12/24* (2006.01)
*H04L 12/703* (2013.01)
*H04L 12/751* (2013.01)

(52) U.S. Cl.
CPC ............... *H04L 45/28* (2013.01); *H04L 45/62* (2013.01); *H04L 41/0672* (2013.01); *H04L 45/02* (2013.01)
USPC .......................................... 370/218; 370/252

(58) Field of Classification Search
CPC ............. H04L 41/12; H04L 29/08738; H04L 43/0823; H04L 41/06; H04L 45/28; H04L 41/0654; H04L 41/0663; H04L 2012/5624
USPC .......... 370/256, 408, 420, 468, 216, 248, 255, 370/469
See application file for complete search history.

(56) References Cited

U.S. PATENT DOCUMENTS 6,026,077 A * 2/2000 Iwata ............................ 370/254
7,085,279 B1 * 8/2006 Kumar et al. ................. 370/401

(Continued)

FOREIGN PATENT DOCUMENTS

JP       2000-224679      8/2000
JP       2002-84558      3/2002

(Continued)

OTHER PUBLICATIONS

L. Berger, Generalized Multi-Protocol Label Switching (GMPLS) Signaling Resource Reservation Protocol—Traffic Engineering (RSVP-TE) Extensions, IETF RFC 3473, Jan. 2003 (Chapter 9, Fault Handling).

(Continued)

*Primary Examiner* — Brian O'Connor
(74) *Attorney, Agent, or Firm* — Scully, Scott, Murphy & Presser, P.C.

(57) ABSTRACT

Apparatus, method and program for restoring path information to its original status when a trouble occurs on a network. An apparatus control part generates, based on a switch information list and an I/F information list stored in a nonvolatile storing part, link information that is prior to the reactivation and used for determining adjacent communication apparatuses. The apparatus control part acquires, via a control network from the adjacent communication apparatuses described in the generated link information, held path information. Thereafter, the apparatus control part (11) decides, based on a stored definition information list, a path sequence such that the path of a lower order layer is placed before the path of an upper order layer. Thereafter, the apparatus control part generates the path information based on the path sequence and further based on the previously acquired held path information.

19 Claims, 17 Drawing Sheets

(56) References Cited

U.S. PATENT DOCUMENTS

| | | | |
|---|---|---|---|
| 7,187,693 B2 * | 3/2007 | Bamba | 370/468 |
| 7,221,646 B2 * | 5/2007 | Kawano et al. | 370/218 |
| 7,333,438 B1 * | 2/2008 | Rabie et al. | 370/242 |
| 7,680,029 B2 * | 3/2010 | Kano et al. | 370/218 |
| 8,098,648 B2 * | 1/2012 | Nakata et al. | 370/351 |
| 2003/0101253 A1 * | 5/2003 | Saito et al. | 709/223 |
| 2003/0145246 A1 * | 7/2003 | Suemura | 714/2 |

FOREIGN PATENT DOCUMENTS

| | | |
|---|---|---|
| JP | 2003-018157 | 1/2003 |
| JP | 2004-128816 | 4/2004 |
| JP | 2005-223449 | 8/2005 |
| JP | 2005-236687 | 9/2005 |

OTHER PUBLICATIONS

A. Satyanarayana, et al. Extensions to GMPLS RSVP Graceful Restart, IETF Internet-Draft draft-ietf-ccamp-rsvp-restart-ext-03, Jun. 2005.

Ping Pan et al., "Graceful Restart Mechanism for RSVP-TE," [online], IETF Network Working Group, 2001.08, [retrieved on Dec. 8, 2006], Retrieved from the Internet: < URL: http://www.watersprings.org/pub/id/draft-pan-rsvp-te-restart-01.txt>, 6. Operations.

* cited by examiner

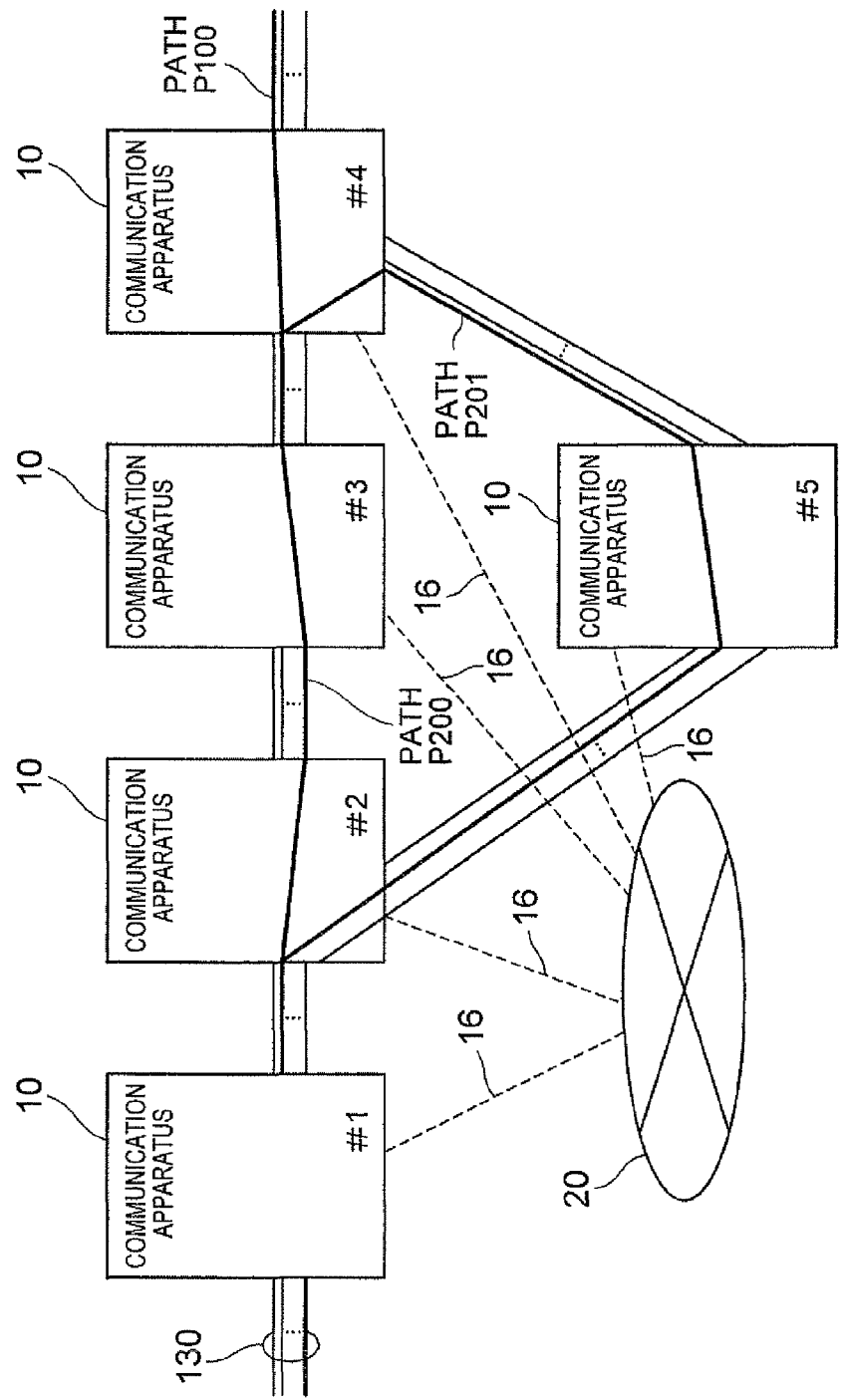

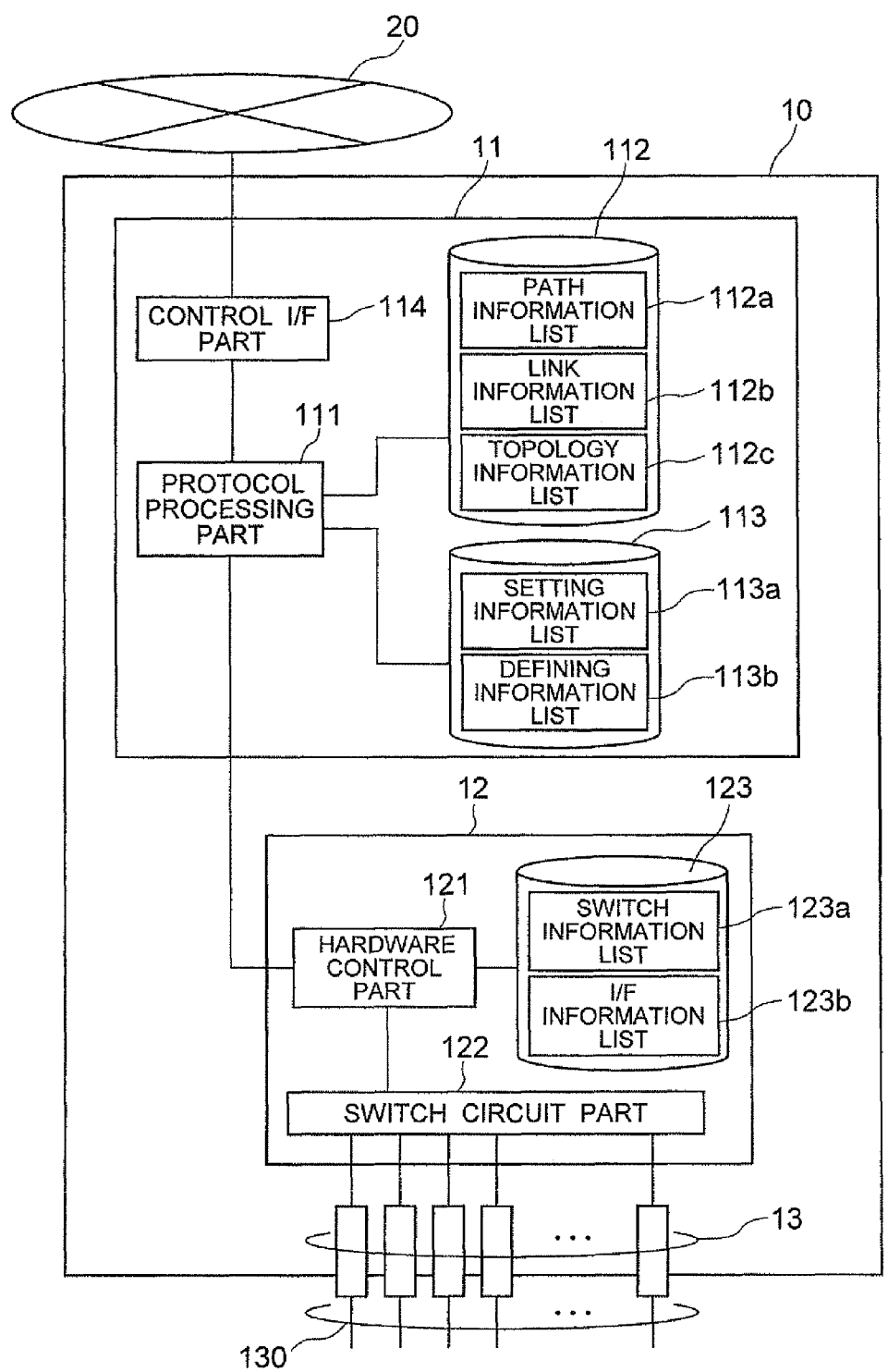

FIG. 3A 112a

| PATH IDENTIFIER |
| --- |
| START-END COMMUNICATION APPARATUS IDENTIFIER |
| TERMINAL-END COMMUNICATION APPARATUS IDENTIFIER |
| PATH BAND |
| IN CONNECTION I/F OF OWN APPARATUS |
| OUT CONNECTION I/F OF OWN APPARATUS |
| IN-LABEL OF OWN APPARATUS |
| OUT-LABEL OF OWN APPARATUS |
| PATH ATTRIBUTE (CURRENT/RESERVED) |
| PATH TROUBLE INFORMATION |

FIG. 3B 112b

| LINK IDENTIFIER |
| --- |
| CONNECTED-LINK IDENTIFIER |
| LINK BAND |
| LINK ATTRIBUTE |
| LINK TROUBLE |
| USE INFORMATION |
| LINK ADDRESS |

FIG. 3C 112c

| COMMUNICATION APPARATUS IDENTIFIER |
| --- |
| (SAME AS LINK INFORMATION) |

FIG. 3D 113a

| ADDRESS INFORMATION |
| --- |
| OPERATING RULE OF ROUTING PROTOCOL DEVICE |
| OPERATING RULE OF SIGNALING PROTOCOL DEVICE |
| OPERATING RULE OF LINK MANAGING PROTOCOL DEVICE |

FIG. 3E 113b

| DEFINITION 1: RESERVED PATH > CURRENTLY USED PATH |
| --- |
| DEFINITION 2: LOWER LAYER PATH > HIGHER LAYER PATH |
| ⋮ |
| DEFINITION N: ⋯ |

FIG. 3F 123a

| CONNECTION IDENTIFIER |
| --- |
| IN CONNECTION I/F |
| OUT CONNECTION I/F |
| IN-LABEL OF OWN APPARATUS |
| OUT-LABEL OF OWN APPARATUS |
| PATH IDENTIFIER |

FIG. 3G 123b

| I/F IDENTIFIER |
| --- |
| BAND |
| I/F ATTRIBUTE |
| I/F TROUBLE |

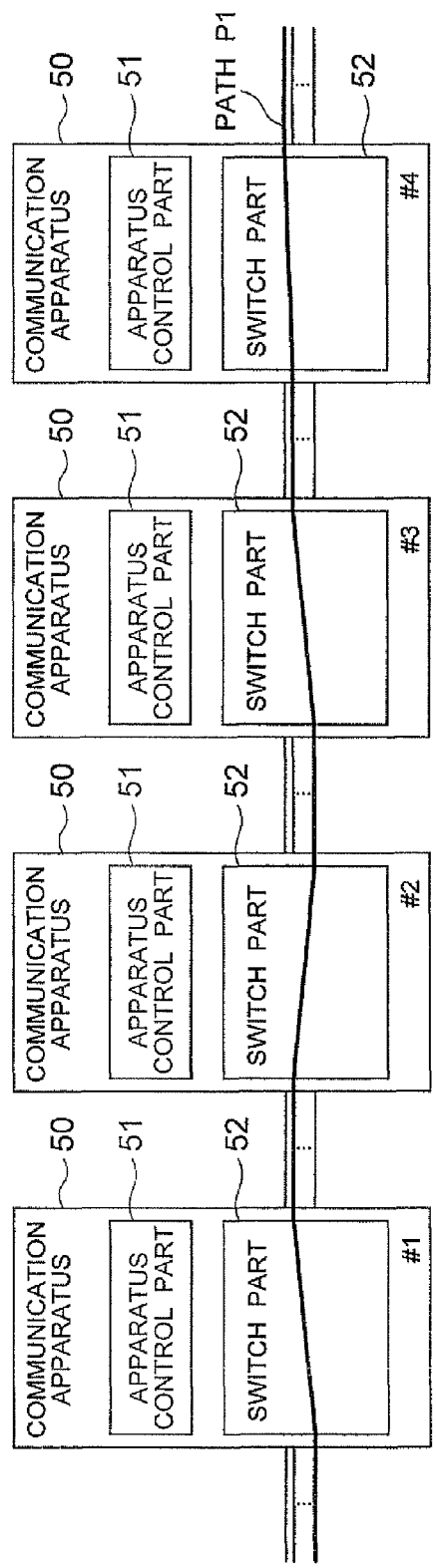

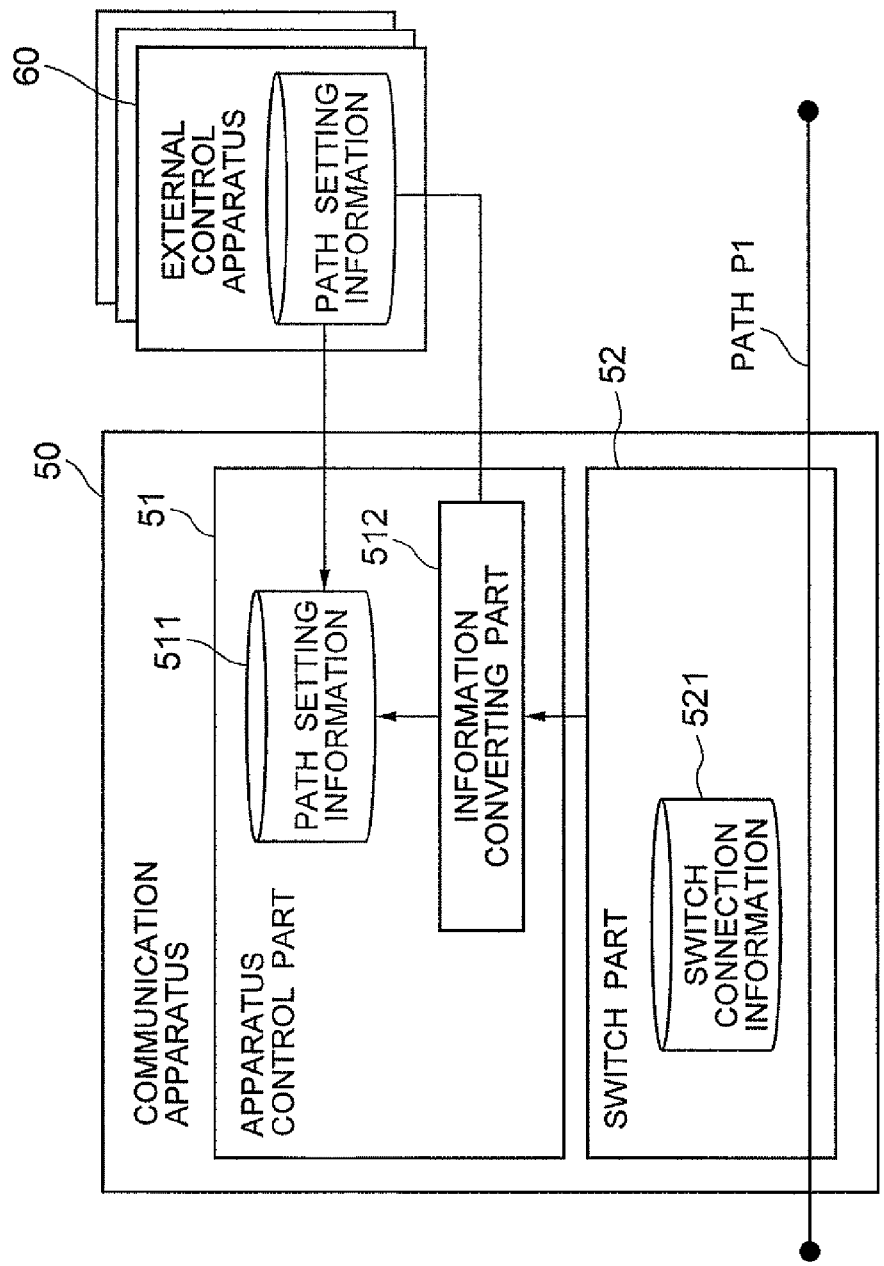

PATH STATE ON CONTROL PLANE

PATH STATE ON CONTROL PLANE

COMMUNICATION APPARATUS, APPARATUS ACTIVATION CONTROL METHOD, COMMUNICATION CONTROL METHOD, AND COMMUNICATION CONTROL PROGRAM

TECHNICAL FIELD

The present invention relates to a communication apparatus used in a communication network, e.g., an optical cross-connect device, SONET (Synchronous Optical Network)/SDH (Synchronous Digital Hierarchy), a cross-connect device, a router, an Ethernet switch, and relates to a control method and a control program.

BACKGROUND ART

In accordance with demands for enabling a communication system to operate autonomously, control software installed to a communication apparatus such as an optical cross-connect device, SONET (Synchronous Optical Network)/SDH (Synchronous Digital Hierarchy), a cross-connect device, a router, or an Ethernet switch has become extremely complicated. With the communication apparatus to which such complicated control software is installed, it may become necessary to restart the device when there is a sudden shutdown caused because of malfunctioning of the control software itself or when upgrading the version of the software for expanding the function. In such cases, it is necessary for the communication apparatus to quickly recover the information handled by the control software into the state of before the restart, in order for the communication apparatus to minimize an influence to user traffic that is flown in the communication network.

A part of the information handled by the control software that is installed to a traditional communication apparatus is not stored in a nonvolatile memory but stored in a volatile memory, considering the cost of the memory. Therefore, it is necessary to rebuild the information stored in the volatile memory, when restarting the control software.

The traditional communication apparatus is a device used in a communication network that is shown in FIG. 12, for example, and it is configured with an apparatus control part 51 and a switch part 52. Out of those parts, the communication control part 51 includes a volatile memory 511 and an information converting part 512 as shown in FIG. 13. Here, the volatile memory 511 stores the path information. The information converting part 512 converts switch connecting information (will be described later) and path information obtained from a plurality of external control devices 60 into path information of the device itself, and stores the path information obtained thereby to the volatile memory 511. The switch part 52 stores the switch connecting information to the volatile memory 521. Each of the external control devices 60 has a function of storing the path information and exchanging the path information among #1-#4 communication apparatuses 50 (See Patent Document 1 and Non-Patent Documents 1, 2, for example).

A service control part shown in Patent Document 1 corresponds to the apparatus control part 51, and a service providing part shown in Patent Document 1 corresponds to the switch part 52. Further, information regarding the service control and information regarding service provision shown in Patent Document 1 correspond to the path information and the switch connecting information, respectively.

Furthermore, "node" shown in Non-Patent Document 1 and Non-Patent Document 2 corresponds to the communication apparatus 50, "control plane" shown in Non-Patent Document 1 and Non-Patent Document 2 corresponds to the apparatus control part 51, "RSVP State" shown in Non-Patent Document and Non-Patent Document 2 corresponds to the path information, and "forwarding state" shown in Non-Patent Document 1 and Non-Patent Document 2 corresponds to the switch connecting information. The switch part 52 is not specifically mentioned in Non-Patent Document 1 and Non-Patent Document 2.

Actions of the above-described traditional communication apparatus when it is restarted will be described separately for a case where the #2 communication apparatus 50 provided in the halfway of a path P1 is restarted and for a case where the #1 communication apparatus provided at the start point of the path P1 is restarted.

(1) Actions of Case when #2 Communication Apparatus 50 Provided in Halfway of Path P is Restarted FIG. 14A is a sequence chart showing the actions of the case where the communication apparatus provided at the halfway point of the path P1 is restarted. FIG. 14B is an illustration showing states of the path P1 in each of the communication apparatuses 50 numbered from #1-#4, when the communication apparatus provided at the halfway point of the path P is restarted. With respect to a restart action, it is assumed here that the apparatus control part 51 rebuilds the path information when a trouble occurs, and the switch part 52 keeps the connected state of the switches.

As shown in FIG. 14A, before the apparatus control part 51 of the #2 communication apparatus 50 is shut down (T1: device shutdown), information of the path P1 is held in all of the #1-#4 communication apparatuses (see (a) of FIG. 14B). In this state, when there is a shutdown because of a malfunction of the control software installed to the apparatus control part 51 of the #2 communication apparatus 50 or other troubles, the apparatus control part 51 of that communication apparatus 50 loses the information of the path P that is stored in the volatile memory (see (b) of FIG. 14B).

Thereafter, the #1 communication apparatus 50 and the #3 communication apparatus 50 as the adjacent devices of the #2 device check a transmitting/receiving state of a Hello message and the like, which are regularly exchanged mutually, so as to detect the fact that the #2 communication apparatus 50 is shut down (T11: trouble detected, T21: trouble detected), and wait for the #2 communication apparatus 50 to restart (see (b) of FIG. 14S). When the restart of the #2 communication apparatus 50 is completed (T2: restart completed), updates of the Hello message and the like are started again. Thus, the #1 communication apparatus 50 and the #3 communication apparatus 50 detect the fact that the trouble of the #2 communication apparatus has been recovered (T12: trouble recovery detected, T22: trouble recovery detected). In this state, the apparatus control part 51 of the #2 communication apparatus 50 can check the presence of the apparatus control parts 51 of the #1 and #3 communication apparatuses 50. However, the path information of the path P is not held therein (see (c) of FIG. 14B).

Upon detecting the trouble recovery, the apparatus control part 51 of the #1 communication apparatus 50 that corresponds to a device on the upstream side of the path P1 transmits recovery signaling (RS1) so that the apparatus control part 51 of the #2 communication apparatus 50 can rebuild the information of the path P1. At that time, the control apparatus part 51 of the #3 communication apparatus 50 that corresponds to a device on the downstream side of the path is in a standby state until the recovering signal (RS1) reaches there.

Upon receiving the recovery signaling (RS1) (T3: path reopening started), the apparatus control part 51 of the #2 communication apparatus 50 rebuilds a part (one direction of a bidirectional path) of the path information. Thereafter, the #2 communication apparatus 50 transmits recovery signaling (RS2) to the apparatus control part 51 of the #3 communication apparatus 50. Upon receiving the recovery signaling (RS2), the apparatus control part 51 of the #3 communication apparatus 50 transmits recovery signaling (RS3) to the apparatus control part 51 of the #2 communication apparatus 50 as a response to the recovery signaling (RS2).

Upon receiving it, the apparatus control part 51 of the #2 communication apparatus 50 rebuilds the remainder of the path information (remainder of the bidirectional path), and transmits recovery signaling (RS4) to the #1 communication apparatus 50 thereafter. At the point of completing transmission of the recovery signaling (RS4), rebuilding of the path information in the #2 communication apparatus 50 is completed (T: path preparation completed), and the path information of the path P1 is completely recovered in all the apparatuses as shown in (d) of FIG. 14B.

(2) Actions of Case when #1 Communication Apparatus Provided at Start Point of Path P is Restarted FIG. 15A is a sequence chart showing the actions of the case where the #1 communication apparatus provided at the start point of the path P1 is restarted. FIG. 15B is an illustration showing states of the path P1 in each of the #1-#4 communication apparatuses 50, when the communication apparatus provided at the start point of the path P1 is restarted. Before the apparatus control part 51 of the #1 communication apparatus 50 is shut down (T1: control software shutdown), information of the path P1 is held in all of the #1-#4 communication apparatuses (see (a) of FIG. 15B).

In this state, when the apparatus control part 51 of the #1 communication apparatus 50 is shut down because of a malfunction of the control software or other troubles, the apparatus control part of the #2 communication apparatus 50 loses the saved information of the path P1 (see (b) of FIG. 15B).

Thereafter, the apparatus control part 51 of the #2 communication apparatus 50 as the adjacent device of the #1 device checks a transmitting/receiving state of a Hello message and the like which are regularly exchanged mutually so as to detect the fact that the #1 communication apparatus 50 is shut down (T11: trouble detected), and waits for the apparatus control part 51 of the #1 communication apparatus 50 to restart (see (b) of FIG. 15B). When the restart of the apparatus control part 51 of the #1 communication apparatus 50 is completed (T2: restart completed), updates of the Hello message and the like are started again. Thus, the #2 communication apparatus 50 detects the fact that the trouble of the #1 communication apparatus 50 has been recovered (T12: trouble recovery detected). In this state, the apparatus control part 51 of the #1 communication apparatus 50 can check the presence of the apparatus control part 51 of the #2 communication apparatus 50. However, the path information of the path P1 is not held therein (see (c) of FIG. 15B).

Upon detecting that the trouble of the #1 communication apparatus is recovered, the apparatus control part 51 of the #2 communication apparatus 50 transmits recovery signaling (RS1) so that the apparatus control part 51 of the #1 communication apparatus 50 can rebuild the information of the path P. Upon receiving the recovery signaling (RS1), the apparatus control part 51 of the #1 communication apparatus 50 rebuilds a part (one direction of a bidirectional path) of the path information, and transmits recovery signaling (RS2) to the apparatus control part 51 of the #2 communication apparatus 50. Upon receiving the recovery signaling (RS2), the apparatus control part 51 of the #2 communication apparatus 50 transmits recovery signaling (RS3) to the apparatus control part 51 of the #1 communication apparatus 50 as a response to the recovery signaling (RS2). With this, the #1 communication apparatus 50 receives the recovery signaling (RS3), and rebuilds the remaining (remainder of the bidirectional path) path information. Thereby, rebuilding of the path information is completed (see (d) of FIG. 15B).

Note here that the actions of a case where there is a trouble in the apparatus control part 51 of the #4 communication apparatus provided at the end point of the path P1 are the same as the above-described case (FIG. 14) where there is a trouble generated at the halfway point, except that the recovery signaling (RS4) is returned without transferring the recovery signaling (RS2, RS3).

Patent Document 1: Japanese Unexamined Patent Publication 2002-84558

Non-Patent Document 1: L. Berger, "Generalized Multi-Protocol Label Switching (GMPLS) Signaling Resource ReserVation Protocol-Traffic Engineering (RSVP-TE) Extensions," IETF RFC 3473, January 2003 (Chapter 9, Fault Handling)

Non-Patent Document 2: A. Satyanarayana, et. al. "Extensions to GMPLS RSVP Graceful Restart," IETF Internet-Draft draft-ietf-ccamp-rsvp-restart-ext-03, June 2005

DISCLOSURE OF THE INVENTION

Problems to be Solved by the Invention

With the traditional communication apparatus described above, when a plurality of paths to be recovered can be individually restarted at the time of restart action, it is possible to recover all the path information securely. However, there are cases where a plurality of paths managed by regular communication apparatuses are not isolated but related to each other. In such case, recovery signaling transmitted from adjacent communication apparatuses arrives in random order. Thus, at the time of restart, the communication apparatus sometimes fails to recover the path information.

For example, as shown in FIG. 16, when the paths are in an N-order hierarchical relation, it is not possible to recover a higher layer path unless a lower layer path is recovered in advance. Further, as shown in FIG. 17, when a currently used path and a plurality of reserved paths are set for securing the high reliability regarding communications, there is a following inconvenience to be raised. That is, if recovery of the reserved path is not completed when switching the path from the currently used path to the reserved path because a trouble is detected again right after recovering the currently used path, switching to the reserved path fails.

In view of the forgoing issues, it is an object of the present invention is to provide a communication apparatus, an apparatus activation control device, a communication control method, and a communication control program, which can securely recover lost path information to its original state, when there is a trouble generated in an apparatus control part of a communication apparatus connected to a network.

Means for Solving the Problems

In order to achieve the aforementioned object, a communication apparatus according to the invention employs a following constitution. That is, the communication apparatus includes a switch part for switching passageways of traffic and an apparatus control part for controlling the switch part. Out of those parts, the apparatus control part includes a protocol processing part operated by prescribed control software and a storing part such as a volatile storing part for saving information held at the protocol, and the switch part includes a control part for controlling a built-in switch circuit part according to a request from the apparatus control part and a nonvolatile storing part for storing a connection state of the switch circuit part. The apparatus control part has a function of rebuilding path information and the like, which is a part of information in the nonvolatile storing part lost in restart of the apparatus, updating the control software, or in other occasions, into an original state based on I/F information held at the nonvolatile storing part of the switch part and path information and the like from adjacent apparatuses.

With this, the nonvolatile storing part of the switch part according to the present invention stores the connection state of the switch circuit part. Therefore, based on the stored connection state and the path information and the like from the adjacent apparatus, it is possible with the apparatus control part to smoothly and securely recover the path information and the like as a part of the information in the volatile storing part, which is lost at the time of restart of the apparatus or the like.

The above-described path information to be rebuilt may be link information held by the protocol processing part and information of a plurality of paths that are related to each other (second aspect). Further, the information of the plurality of related paths may be information of a plurality of paths that are in a hierarchical relation in which a higher layer path utilizes a lower layer path (third aspect). Furthermore, the information of the plurality of related paths may be information of a plurality of paths that are in a relation of a currently used path and its reserved path.

Further, the apparatus control part may include a path order control device which rebuilds a plurality of paths sent from the adjacent apparatuses to the protocol processing part based on defining information set in advance for defining an order of rebuilding the paths, so as to execute a function of rebuilding the paths thereby.

Therefore, with the present invention, the defining information that defines the order of rebuilding the paths functions effectively, so that the path information and the like can be recovered (rebuilt) by the path order control device securely and efficiently.

Further, the protocol processing part described above includes a logical I/F managing device which functions when the protocol processing part is in a processing action to manage logical I/F, and the logical I/F managing device has a function of storing a lower layer path as the logical I/F to the nonvolatile storing part, when setting the paths that are put in a hierarchical relation. At the same time, the apparatus control part described above may be structured to have a function of rebuilding, after restarting the apparatus control part, path information of a plurality of hierarchical paths stored in the volatile part, which is lost in restart of the apparatus or updating the control software, based on the I/F information held at the nonvolatile storing part of the switch part, logical I/F information held by the apparatus control part, and the information of the plurality of paths transmitted from the adjacent apparatuses, regardless of an order.

With this, while saving the lower layer path to the nonvolatile storing part as the logical I/F, the information of the plurality of paths related to each other is rebuilt after rebuilding a physical I/F and the logical I/F at the time of restart. This makes it possible to prevent such a state where there is no link in the lower layer when building the higher layer path. As a result, the information of the plurality of paths in a relation of N-order hierarchical relation can be recovered to the state of before the restart securely without minding the order of the path information transmitted from the adjacent apparatuses.

Further, the protocol processing part described above may include an information delaying device which, when a trouble occurs in a processing action of the protocol processing part, delays information of the trouble. The apparatus control part may have a function of rebuilding, after restarting the apparatus control part, path information of a plurality of paths stored in the volatile part, which is lost in restart of the apparatus or updating the control software, based on the I/F information held at the nonvolatile storing part of the switch part, and information of the plurality of paths transmitted from the adjacent apparatus, and have a function of notifying the trouble information delayed by the information delaying device to other adjacent communication apparatuses after completing the rebuilding, and of recovering the trouble.

This makes it possible to delay the trouble information when rebuilding the path information until the rebuilding of the paths is completed, even when there is a trouble occurred at the time of restarting the control software, for example. Thus, recovery of the trouble is not executed during the rebuilding of the paths. Accordingly, the information of the plurality of paths in the relation of the currently used path and its reserved path can be recovered securely to the state of before the restart without minding the order of the path information transmitted from the adjacent apparatuses. At the same time, it becomes possible to perform recovery of the trouble securely.

A communication apparatus according to the present invention may be structured as follows. That is, the communication apparatus according to the present invention is used by being connected to a network having a hierarchical structure in which a higher layer path is subordinate to a lower layer path when building path information of the paths for transmitting user traffic, and connected to a control network which receives/transmits a control message. The communication apparatus includes: an I/F information storing device for storing I/F information that shows physical information of the paths; a switch information storing device for storing switch information that shows a state of switches connected to communication channels that configure the paths; and a path order defining information storing device for storing order defining information for defining an order of the paths for building the path information.

Further, the communication apparatus includes: a link information generating device which functions after restart to generate link information of before the restart for specifying all the adjacent communication apparatuses based on the I/F information stored in the I/F information storing device and the switch information stored in the switch information storing device; and a held path information acquiring device for acquiring held path information held by the communication apparatuses from all the adjacent communication apparatuses written in the link information that is generated by the link information generating device via the control network.

Furthermore, the communication apparatus includes an order determining device which determines the order of the paths in such a manner that the lower layer path comes first and the higher layer path comes thereafter when generating the path information based on the order defining information that is stored in the path order defining information storing device, when the held path information acquiring device acquires the held path information held by all the adjacent communication apparatuses, and a path information generating device which generates the path information based on the order of the paths determined by the path order determining device and the held path information acquired by the held path information acquiring device.

Therefore, the path order determining device according to the present invention determines the path order in such a manner that the lower layer path comes first and the higher layer comes thereafter when generating the path information based on the order defining information that is stored in the path order defining information storing device. This makes it possible to recover the path information securely after there is a trouble occurred in the communication apparatus.

Further, the communication apparatus according to the present invention includes: an I/F information storing device for storing I/F information that shows physical information of the paths; a switch information storing device for storing switch information that shows a state of switches connected to communication channels that configure the paths; and a logical I/F information storing device for storing logical I/F information that shows logical information of the paths. Further, the communication apparatus includes: a link information generating device which functions after restart to generate link information of before the restart for specifying all adjacent communication apparatuses based on the I/F information stored in the I/F information storing device, the logical I/F information stored in the logical I/F information storing device, and the switch information stored in the switch information storing device; a held path information acquiring device for acquiring the held path information held by the communication apparatuses from all the adjacent communication apparatuses written in the link information that is generated by the link information generating device via the control network; and a path information generating device for generating the path information when the held path information acquiring device acquires the held path information, regardless of whether or not the lower layer path information is formed in advance.

Therefore, the link information generating device according to the present invention generates the link information of before the restart for specifying all the adjacent communication apparatuses based on the I/F information, the logical I/F information, and the switch information. Thus, the link information contains logical information of the link. As a result, even if the held path information of the higher layer path is acquired earlier than the held path information of the lower layer path, it is possible to generate the higher layer path information before the lower layer path information by using the link information that contains the logical information. That is, the path information can be generated in the acquired order of the held path information regardless of the hierarchical order.

The communication apparatus according to the present invention may be structured to further include: a concealed I/F information generating device which, when trouble information is written to the I/F information stored in the I/F information storing device, rewrites it to a proper value to generate I/F information in which the trouble information is concealed; and a concealed logical I/F information generating device which, when trouble information is written to the logical I/F information stored in the logical I/F information storing device, rewrites it to a proper value to generate logical I/F information in which the trouble information is concealed. Further, the link information generating device may be structured to function after restart to generate link information of before the restart for specifying all the adjacent communication apparatuses based on the concealed I/F information generated by the concealed I/F information generating device by rewriting the trouble information to the proper value, the concealed logical I/F information generated by the concealed logical I/F information generating device by rewriting the trouble information to a proper value, and the switch information stored in the switch information storing device.

Further, the path information generated by the path information generating device of the communication apparatus contains path attribute information which shows attribute of a currently used path and attribute of a reserved path that is used when there is a trouble occurred in the currently used path. Furthermore, the communication apparatus may further include: a trouble information acquiring device for acquiring, from adjacent communication apparatuses, trouble information that indicates occurrence of a communication trouble in the network; a trouble information writing device which writes the trouble information acquired by the trouble information acquiring device into the I/F information storing device, and writes the trouble information to information indicating that there is no trouble, when the path information is generated by the path information generating device; a troubled link specifying device which, after the path information is generated by the path information generating device, specifies information of the link where the trouble is generated based on the trouble information stored in the I/F information storing device; a troubled path detecting device for detecting the path that is affected by the trouble, from the link information specified by the troubled link specifying device; and a path switching request device which transmits, via the control network, a path switching request for switching the currently used path to the reserved path to the adjacent communication apparatus that is connected to the path where the trouble detected by the troubled path detecting device occurred.

Since the path information according to the present invention contains the currently used path and the reserved path, it is possible to switch the currently used path to the reserved path for the adjacent communication apparatus to which the path where the trouble detected by the troubled path detecting device occurred is connected, when there is a trouble occurred in the path after building the path information.

A communication apparatus activation control method according to the present invention employs followings as a basic structure. That is, the communication apparatus activation control method includes: a first step which restarts an apparatus control part provided to a communication apparatus; a second step which retains I/F information stored in a storing part of a switch part that is provided side by side with the apparatus control part, as well as path information and the like sent from adjacent apparatuses; and a third step which rebuilds information of a plurality of paths and the like, which is lost from the storing part of the apparatus control part in a restart action or the like, into information of a plurality of paths that are related to each other as an original state based on the retained information.

With this, it is possible to recover the path information and the like by utilizing, in a well-ordered manner, the connection state of the switch circuit part stored in the nonvolatile storing part of the switch part and the path information and the like from the adjacent apparatuses. Therefore, the path information and the like can be recovered smoothly and promptly without going through an ineffective work.

When executing the third step, a path order control device provided to the apparatus control part may operate based on the defining information set in advance for defining an order of rebuilding the paths so as to rebuild the information of the plurality paths and the like to an original state.

Further, when executing the third step, physical I/F information may be executed first, and the information of the plurality related paths may be rebuilt thereafter in order according to the defining information that is set in advance for defining a priority order for rebuilding the paths.

Furthermore, a plurality of paths in a hierarchical relation in which a higher layer path utilizes a lower layer path may be considered targets as the information of the plurality of related paths of the third step, and the plurality of paths in such hierarchical relation may be rebuilt to the original state.

Moreover, a plurality of paths in a relation of a currently used path and its reserved path may be considered targets as the information of the plurality of related paths of the third step, and the plurality of paths in such relation of the currently used path and the reserved path may be rebuilt to the original state.

Further, a communication control method according to the present invention is a control method which, when building path information of a path that transmits user traffic, controls to transmit the user traffic to a network that has a hierarchical structure in which a higher layer path is subordinate to a lower layer path, and allows each communication apparatus to control transmission/reception of a control message between the communication apparatuses via a control network. After restart of the communication apparatus, an apparatus control part of the communication apparatus: generates link information of before the restart for specifying all adjacent communication apparatuses based on I/F information stored in advance for showing physical information of the paths and switch information indicating a state of switches connected to communication channels that configure the paths; acquires held path information held in the communication apparatuses from all the adjacent communication apparatuses written in the generated link information via the control network; determines thereafter an order of the paths in such a manner that the lower layer path comes first and the higher layer path comes thereafter when generating the path information based on order defining information that is set separately in advance for defining the path order for building the path information; and generates the path information based on the determined path order and the held path information that is acquired earlier.

Thus, when generating the path information, the present invention determines the path order in such a manner that the lower layer path comes first and the higher layer path comes thereafter based on the order defining information stored in advance. Therefore, even if there is a trouble occurred in the communication apparatus, it becomes possible to securely recover the path information thereafter.

Further, a communication control method according to the present invention is a control method which, when building path information of a path that transmits user traffic, controls to transmit the user traffic to a network that has a hierarchical structure in which a higher layer path is subordinate to a lower layer path, and allows each communication apparatus to control transmission/reception of a control message between the communication apparatuses via a control network. After restart of the communication apparatus, an apparatus control part of the communication apparatus: generates link information of before the restart for specifying all adjacent communication apparatuses based on I/F information stored in advance for showing physical information of the paths, logical I/F information indicating logical information of the paths, and switch information indicating a state of switches connected to communication channels that configure the paths; acquires held path information held in the communication apparatus from all the adjacent communication apparatuses written in the generated link information via the control network; and generates the path information thereafter, regardless of whether or not a lower layer path information is formed in advance.

Therefore, the present invention generates the link information of before the restart for specifying all the adjacent communication apparatuses based on the I/F information, the logical I/F information, and the switch information. Thus, the link information contains logical information of the link. As a result, even if the held path information of the higher layer path is acquired earlier than the held path information of the lower layer path, it is possible to generate it earlier than the lower layer path information by using the link information that contains the logical information. That is, the path information can be generated in the acquired order of the held path information regardless of the hierarchical order.

The communication control method may, after restarting the communication apparatus described above: when trouble information is written in the I/F information, rewrite it to a normal value to generate I/F information in which the trouble information is concealed; when trouble information is written in the logical I/F information, rewrite it to a normal value to generate logical I/F information in which the trouble information is concealed; and generate link information of before the restart for specifying all adjacent communication apparatuses based on the I/F information in which the trouble information is rewritten to the normal value to conceal it, the logical I/F information in which the trouble information is rewritten to the normal value to conceal it, and the switch information.

Further, in the communication control method, the generated path information may contain path attribute information which shows attribute of a currently used path and attribute of a reserved path that is used when there is a trouble occurred in the currently used path. The communication control method may be configured to: acquire, from adjacent communication apparatuses, trouble information indicating that there is an occurrence of a communication trouble in the network; write the acquired trouble information to the storing device; generate the path information, and then specify information of a link where the trouble is generated, based on the trouble information written to the storing device; detect the path that is affected by the trouble from the specified link information; and transmit, via the control network, a request for switching the currently used path to the reserved path to the adjacent communication apparatus that is connected to the path where the detected trouble occurred.

Since the path information according to the present invention contains the currently used path and the reserved path, it is possible to switch the currently used path to the reserved path for the adjacent communication apparatus to which the path with the trouble detected by the troubled path detecting device is connected, when there is a trouble occurred in the path after building the path information.

A communication control program according to the present invention is a control program which, when building path information of a path for transmitting user traffic, controls transmission of the user traffic to a network that has a hierarchical structure in which a higher layer path is subordinate to a lower layer path, and allows each communication apparatus to control transmission/reception of a control message between the communication apparatuses via a control network. The communication control program enables a computer to execute: after restarting the communication apparatus, a procedure for generating link information of before the restart for specifying all adjacent communication apparatuses based on I/F information that is stored separately in advance for showing physical information of the paths, and switch information showing a state of switches connected to communication channels that configure the paths; a procedure for acquiring, via the control network, held path information held by the communication apparatuses from all the adjacent communication apparatuses that are written in the generated link information; a procedure for determining an order of the paths in such a manner that a lower layer path comes first and a higher layer path comes thereafter when generating the path information based on order defining information that is set and stored in advance for defining the order of the paths which build path information; and a procedure for generating the path information based on the determined path order and the held path information acquired earlier.

Thus, when generating the path information, the present invention determines the path order in such a manner that the lower layer path comes first and the higher layer path comes thereafter based on the order defining information stored in advance. Therefore, it becomes possible for the communication apparatus to securely recover the path information when a trouble occurs.

Furthermore, a communication control program according to the present invention is a control program which, when building path information of a path for transmitting user traffic, controls transmission of the user traffic to a network that has a hierarchical structure in which a higher layer path is subordinate to a lower layer path, and allows each communication apparatus to control transmission/reception of a control message between the communication apparatuses via a control network. The communication control program enables a computer to execute: after restarting the communication apparatus, a procedure for generating link information of before the restart for specifying all adjacent communication apparatuses based on I/F information that is stored in advance for showing physical information of the paths, logical I/F information for showing logical information of the paths, and the switch information showing a state of switches connected to communication channels that configure the paths; a procedure for acquiring, via the control network, held path information held by the communication apparatuses from all the adjacent communication apparatuses that are written in the generated link information; and a procedure for generating the path information thereafter, regardless of whether or not a lower layer path information is formed in advance.

Therefore, the present invention generates the link information of before the restart for specifying all the adjacent communication apparatuses based on the I/F information, the logical I/F information, and the switch information. Thus, the link information contains logical information of the link. As a result, even if the held path information of the higher layer path is acquired earlier than the held path information of the lower layer path, it is possible to generate it earlier than the lower layer path information by using the link information that contains the logical information. That is, the path information can be generated in the acquired order of the held path information regardless of the hierarchical order.

Effects of the Invention

With the present invention, it is possible to provide a communication apparatus, an apparatus activation control method, a communication control method, and communication control program, which are capable of securely recovering the information of a plurality of paths that are related to each other to the state of before the restart, even when path information and the like are lost because of a trouble occurred in an apparatus control part at the time of restart or the like of a communication apparatus that is connected to a network.

BEST MODE FOR CARRYING OUT THE INVENTION

The best modes for embodying the present invention will be described hereinafter by referring to the accompanying drawings. First, the overall structures and the important points of the exemplary embodiments of the invention will be described.

Overall Structures and Functions

As shown in FIG. 1-FIG. 11, a communication apparatus 10 according to the exemplary embodiments is used by being connected to a network in which a higher layer path is subordinate to a lower layer path when building path information of the paths for transmitting user traffic, and by being connected to a control network which receives/transmits control messages.

This communication apparatus 10 includes a switch part 12 for switching passageways of the traffic and an apparatus control part 11 for controlling the switch part 12. Out of those parts, the apparatus control part 11 employs, as a basic structure, a constitution that has a protocol processing part 111 operated by prescribed control software and a storing part such as a volatile storing part 112 or the like for saving information held by the protocol processing part 111. Further, the switch part 12 includes a control part 121 which controls a built-in switch circuit part 122 according to a request from the above-described apparatus control part 11, and a nonvolatile storing part 123 for storing a connection state of the switch circuit part 122. Then, the above-described apparatus control part 11 includes a function of rebuilding path information and the like, which is a part of the information in the volatile storing part 112 lost at the time of restating action of the apparatus, updating the control software, or in other occasions, into an original state based on I/F information 123b held by the nonvolatile storing part 123 of the above-described switch part 12 and the path information and the like from an adjacent apparatus. These structures are employed as the basic structures.

With this, the nonvolatile storing part 123 of the switch part 12 according to the exemplary embodiment stores the connection state of the switch circuit part 122. Therefore, based on the stored connection state and the path information and the like from the adjacent apparatus, it is possible with the apparatus control part 11 to smoothly and securely recover the path information and the like as a part of the information in the volatile storing part 112, which is lost at the time of restart of the apparatus or the like.

The above-described path information to be rebuilt means link information held by the above-described protocol processing part 111 and information of a plurality of paths that are related to each other. Further, the information of the plurality of paths related to each other means the information of the plurality of paths in a hierarchical relation in which the higher layer path utilizes the lower layer path. Furthermore, the information of the plurality of related paths may be the information of a plurality of paths that are in a relation of a currently used path and its reserved path.

Further, the above-described apparatus control part 11 includes a path order control device 37 (see FIG. 4), which rebuilds a plurality of paths sent from the adjacent apparatuses to the above-described protocol processing part 111 based on a preset defining information 113b that defines the order of rebuilding the paths. The function of rebuilding the paths is executed by the path order control device 37.

Therefore, with the exemplary embodiment, the defining information that defines the order of rebuilding the paths functions effectively. Thereby, it becomes possible to recover (rebuild) the above-described path information and the like with the path order control device 37 securely and efficiently.

Furthermore, the above-described protocol processing part 111 sets a logical I/F managing device 38 (see FIG. 8) which functions at the time of processing actions to manage logical I/F, and the logical I/F managing device 38 is structured to have a function of saving the lower layer path to the nonvolatile storing part as the logical I/F when setting the hierarchical paths. At the same time, the above-described apparatus control part 11 has a function of rebuilding, after restart of the apparatus control part 11, the information of the plurality of hierarchical paths stored in the volatile storing part 112, which is lost at the time of restarting the apparatus control part 11, updating the control software, or in other occasions based on the I/F information 123b held by the nonvolatile storing part 123 of the above-described switch part 12, the logical I/F information held by the apparatus control part 11, and the information of the plurality of paths transmitted from the adjacent apparatuses, regardless of the order.

Therefore, while saving the lower layer path to the nonvolatile storing part 123 as the logical I/F, the information of the plurality of paths related to each other is rebuild after rebuilding physical I/F and the logical I/F at the time of restart. This makes it possible to prevent such a state where there is no link in the lower layer when building the higher layer path. As a result, the information of the plurality of paths in an N-order hierarchical relation can be recovered to the state of before the restart securely without minding the order of the path information transmitted from the adjacent apparatuses.

Further, the above-described protocol processing part 111 includes an information delaying device 39 (see FIG. 8) for delaying trouble information when there is a trouble occurred during the processing action thereof. The apparatus control part 11 has a function of rebuilding the information of the plurality of paths stored in the volatile storing part 112, which is lost at the time of restarting the apparatus control part 11 or updating the control software, based on the I/F information held by the nonvolatile storing part 123 of the switch part 12, and the information of the plurality of paths transmitted from the adjacent apparatuses after the restart of the apparatus control part 11. At the same time, the apparatus control part 11 has a function of informing the trouble information delayed by the information delaying device 39 to the other adjacent communication apparatuses and recovering the trouble, after completing the rebuilding.

This makes it possible to delay the trouble information when rebuilding the path information until the rebuilding of the paths is completed, even when there is a trouble occurred at the time of restarting the control software, for example. Thus, recovery of the trouble is not executed during the rebuilding of the paths. Accordingly, the information of the plurality of paths in the relation of the currently used path and its reserved path can be recovered securely to the state of before the restart without minding the order of the path information transmitted from the adjacent apparatuses. At the same time, it becomes possible to perform recovery of the trouble securely.

Further, the communication apparatus 10 according to the exemplary embodiment may be structured as follows. That is, the communication apparatus according to the exemplary embodiment is used by being connected to a network having a hierarchical structure in which a higher layer path is subordinate to a lower layer path when building path information of the paths for transmitting user traffic, and by being connected to a control network 20 which receives/transmits control messages. The communication apparatus 10 includes: the above-described I/F information storing device (nonvolatile storing part 123: see FIG. 2) for storing I/F information that shows physical information of the paths; the above-described switch information storing device (nonvolatile storing part 123) for storing the switch information that shows the state of the switches connected to communication channels that configure the paths; and the above-described path order defining information storing device (nonvolatile storing part 113) for storing the order defining information for defining the order of the paths for building the path information.

Furthermore, the communication apparatus 10 includes: a link information generating device (resource managing device 36: see FIG. 4) which functions after the restart to generate link information of before the restart for specifying all the adjacent communication apparatuses based on the I/F information stored in the I/F information storing device and the switch information stored in the switch information storing device; and a held path information acquiring device (signaling protocol device 33: see FIG. 4) for acquiring, via the control network 20, the held path information held by the communication apparatuses 10 from all the adjacent communication apparatuses 10 written in the link information that is generated by the link information generating device.

Further, the communication apparatus 10 includes: an order determining device (path order control device 37: see FIG. 4) which determines the order of the paths in such a manner that the lower layer path comes first and the higher layer path comes thereafter when generating the path information based on the order defining information that is stored in the above-described path order defining information storing device, when the above-described held path information acquiring device acquires the held path information held by all the adjacent communication apparatuses; and a path information generating device (resource managing device 36: see FIG. 4) which generates the path information based on the order of the paths determined by the order determining device and the held path information acquired by the held path information acquiring device.

Therefore, when generating the path information based on the order defining information stored in the order determining device and the order defining information storing device, the order is determined in such a manner that the lower layer path comes first and the higher layer path comes thereafter. It is therefore advantageous in respect that the path information can be recovered securely after a trouble occurs in the communication apparatus 10.

Furthermore, the communication apparatus 10 according to the exemplary embodiment includes: an I/F information storing device (nonvolatile storing part 123) for storing I/F information that shows physical information of the paths; a switch information storing device (nonvolatile storing part 123) for storing the switch information that shows the state of the switches connected to communication channels that configure the paths; and a logical I/F information storing device (nonvolatile storing part 113) for storing logical I/F information that shows logical information of the paths. Moreover, the communication apparatus 10 includes: a link information generating device (resource managing device 36: see FIG. 4) which functions after the restart to generate link information of before the restart for specifying all the adjacent communication apparatuses 10 based on the I/F information stored in the I/F storing device, the logical I/F information stored in the logical I/F information storing device, and the switch information stored in the switch information storing device; a held path information acquiring device (signaling protocol device 33: see FIG. 4) for acquiring, via the control network 20, the held path information held by the communication apparatuses 10 from all the adjacent communication apparatuses 10 written in the link information that is generated by the link information generating device; and a path information generating device (resource managing device 36: see FIG. 4) for generating the path information when the above-described held path information acquiring device acquires the held path information, regardless of whether or not the lower layer path information is formed in advance.

Since the link information generating device generates the link information of before the restart for specifying all the adjacent communication apparatuses based on the I/F information, the logical I/F information, and the switch information, the link information contains the logical information regarding the link. Therefore, even if the held path information of the higher layer path is acquired earlier than the held path information of the lower layer path, it is possible to generate the higher layer path information before the lower layer path information by using the link information that contains the logical information. That is, it is possible to generate the path information in order of acquiring the held path information regardless of the hierarchical order.

The communication apparatus 10 according to the exemplary embodiment further includes: a concealed I/F information generating device (information delaying device 39: see FIG. 8) which, when trouble information is written to the I/F information stored in the above-described I/F information storing device, rewrites it to a proper value to generate I/F information in which the trouble information is concealed; and a concealed logical I/F information generating device (information delaying device 39: see FIG. 8) which, when trouble information is written to the logical I/F information stored in the above-described logical I/F information storing device, rewrites it to a proper value to generate logical I/F information in which the trouble information is concealed. Further, the above-described link information generating device has a function that works after the restart to generate link information of before the restart for specifying all the adjacent communication apparatuses 10 based on: the concealed I/F information generated by the concealed I/F information generating device by rewriting the trouble information to a proper value; the concealed logical I/F information generated by the concealed logical I/F information generating device by rewriting the trouble information to a proper value; and the switch information stored in the switch information storing device.

Further, the path information generated by the above-described path information generating device of the communication apparatus 10 contains path attribute information which shows attribute of the currently used path and attribute of the reserved path used when there is a trouble occurred in the currently used path.

Furthermore, the communication apparatus 10 includes: a trouble information acquiring device (signaling protocol device 33: see FIG. 4) for acquiring trouble information that indicates occurrence of a communication trouble in the network from other adjacent communication apparatuses 10; a trouble information writing device (I/F managing device 42: see FIG. 8) which writes the trouble information acquired by the trouble information acquiring device into the I/F information storing device, and writes the trouble information to information indicating that there is no trouble when the path information is generated by the path information generating device; a troubled link specifying device which, after the path information is generated by the path information generating device, specifies information of the link where the trouble is generated based on the trouble information stored in the I/F information storing device; a troubled path detecting device (I/F managing device 42: see FIG. 8) for detecting the path that is affected by the trouble based on the link information specified by the troubled link specifying device; and a path switching request device (signaling protocol device 33: see FIG. 4) which transmits, via the control network 20, a path switching request for switching the currently used path to the reserved path to the adjacent communication apparatus 10 that is connected to the path where the trouble detected by the troubled path detecting device occurred.

Since the path information contains the currently used path and the reserved path, it is possible to switch the currently used path to the reserved path for the adjacent communication apparatus 10 to which the path where detected trouble occurred is connected, when there is a trouble occurred in the path after building the path information.

Next, the overall structural contents described above will be explained hereinafter in a concrete manner separately as a first exemplary embodiment and a second exemplary embodiment.

First Exemplary Embodiment

FIG. 1 shows an overall structure of a communication system that includes communication apparatuses according to the first exemplary embodiment. FIG. 2 shows the structure of the communication apparatus according to the first exemplary embodiment.

As shown in FIG. 1, communication apparatuses 10 of #1-#5 according to this exemplary embodiment are apparatuses used in an optical network as described above, which transmit/receive control messages to adjacent communication apparatuses 10 via the control network 20 and control channels 16. The optical network has a main signal physical channel 130 that is configured with 1–N numbers of optical fibers for transmitting user traffic other than the control messages. Further, the paths of the optical network formed between each of the communication apparatuses 10 are put in a hierarchy. "Putting the paths in a hierarchy" herein means that there is a relation in which a higher layer path is subordinate to a lower layer path when building path information of the paths.

Further, for transmitting the user traffic, three paths configured with paths P100, P200, and P201, for example, are formed between the #1-5 communication apparatuses 10 in the optical network. The path P200 is a currently used path between the #2 communication apparatus 10 and the #4 communication apparatus 10, and the path 2201 is a reserved path for the currently used path P200 between the #2 communication apparatus 10 and #4 communication apparatus 10 via the #5 communication apparatus 10.

As shown in FIG. 2, the #1-#5 communication apparatuses 10 are formed to include an apparatus control part 11, a switch part 12, and a main signal I/F part 13. Out of those parts, the apparatus control part 11 controls the apparatus itself, and also exchanges control messages with the apparatus control parts 11 of the adjacent communication apparatuses 10 via the control network 20. The apparatus control part 11 includes a protocol processing part 111, a volatile storing part 112, a nonvolatile storing part 113, and a control I/F part 114.

The protocol processing part 111 has a CPU (not shown). The CPU executes control software stored in the nonvolatile storing part 113 so as to execute the processing performed by each protocol device to be described later.

The volatile storing part 112 is a device formed with DRAM, for example, which stores information that is erased when the apparatus 10 is restarted. The volatile storing part 112 stores: path information list 112a in which path information for specifying the paths for transmitting the user traffic is written; link information list 112b in which link information for specifying the links connecting between the nodes is written; and a topology information list 112c in which topology information showing the connecting form of the nodes via the links is written.

As shown in FIG. 3A, written in the path information list 112a is the path information that contains a path identifier, a start-end communication apparatus identifier, a terminal-end communication apparatus identifier, a path band, an IN connection I/F of own apparatus, an OUT connection I/F of own apparatus, IN-LABEL of own apparatus, OUT-LABEL of own apparatus, path attribute (current use/reserved use), and path trouble information.

The path identifier contains information for identifying the path for transmitting the user traffic. The start-end communication apparatus identifier contains information for identifying the communication apparatus arranged at the start-end of the optical network, and the terminal end communication apparatus identifier contains information for identifying the communication apparatus arranged at the terminal end. The path band contains information showing communication speed for transferring the user traffic. The In connection I/F of own apparatus contains information for designating a switch that is used among a group of switches configuring the switch circuit part 122 when receiving the traffic, and the OUT connection I/F of own apparatus contains information for designating a switch that is used when transmitting the traffic. The IN-LABEL of own apparatus contains information for designating the adjacent communication apparatus 10 as the receiver of the user traffic, and the OUT-LABEL of own apparatus contains information for designating the adjacent communication apparatus 10 as the sender of the user traffic. The path attribute (current use/reserved use) contains information indicating whether the path is the currently used path or the reserved path. The path trouble information contains information on the trouble occurred on the path.

As shown in FIG. 3B, written in the link information list 112b is the link information that contains a link identifier, a connected-link identifier, a link band, link attribute, link trouble, use information, and a link address.

The link identifier contains information for identifying the link to transfer the user traffic. The connected-link identifier contains information for identifying the link stipulated for the communication apparatus 10 to which the user traffic is transferred. The band contains the communication speed for transmitting to the link. The link attribute contains information for indicating the attribute of the link. The link trouble contains the information on the trouble occurred in the link. The use information contains use information of the link. The link address contains the address for identifying the link.

As shown in FIG. 3C, written in the topology information list 112c is topology information configured with the same kinds of information as those of the communication apparatus identifier and link information. The link information, the path information, and the topology information is the information collected or set by the control software autonomously. The identifier provided to the own apparatus is written in the section of the communication apparatus identifier.

The nonvolatile storing part (path order defining information storing device, logical I/F information storing device) 113 shown in FIG. 2 is a device configured with ROM, EEPROM, for example, which stores the information that is not erased even after a restart action. The nonvolatile storing part 113 stores setting information list 113a and defining information list 113b.

As shown in FIG. 3D, written in the setting information list 113a is address information indicating the link address that is required when building the link information, and information for stipulating actions of each protocol part. The address information is information inputted and set by an operator of the apparatus manually.

Further, as shown in FIG. 3E, written in the defining information list 113b is a definition for determining a preferential path when rebuilding the path information. For example, the reserved path has priority over the currently used path, and the lower layer path has priority over the higher layer path.

The control I/F part 114 shown in FIG. 2 interfaces the control network 20 with the protocol processing part 111. That is, the control I/F part 114 transmits a control message outputted from the protocol processing part 11 to the adjacent communication apparatus 10 via the control network 20, and outputs, to the protocol processing part 11, a response for the control message transmitted from the communication apparatus 10 via the control network 20.

The switch part 12 is connected to #1-#N main signal physical channels 130 that are guided out from the main signal I/F part 13. The switch part 12 includes a hardware control part 211, a switch circuit part 122, and a nonvolatile storing part 123.

The hardware control part 121 has a CPU (not shown). The CPU executes control software stored in the nonvolatile storing part 123 so as to execute the processing performed by each protocol device to be described later.

Further, the switch circuit part 122 switches the #1-#N main signal physical channels 130 that are guided out from the main signal I/F part 13 according to a channel switching request from the hardware control part 121.

Further, the nonvolatile storing part (I/F information storing device, switch information storing device) 123 is a storing device configured with ROM, EEPROM, for example. The nonvolatile storing part 123 stores control software (not shown) that controls the switch part 12, as well a switch information list 123a and an I/F information list 123b.

As shown in FIG. 3F, the switch information list 123a contains switch information that is configured with a connection identifier, an IN connection I/F, an OUT connection I/F, an IN-LABEL of own apparatus, an OUT-LABEL of own apparatus, and a path identifier.

The above-described connection identifier contains information on the link to be connected. The IN connection I/F contains information indicating the switch when receiving user traffic, and the OUT connection I/F contains information indicating the switch when transmitting the user traffic. The IN-LABEL of own apparatus contains information for designating the adjacent communication apparatus 10 as the receiver of the user traffic, and the OUT-LABEL of own apparatus contains information for designating the adjacent communication apparatus 10 as the sender of the user traffic. The path identifier contains information for identifying a path transmitting the user traffic.

As shown in FIG. 3G, written in the I/F information list 123b is I/F information containing an I/F identifier, a band, an I/F attribute, and an I/F trouble.

Out of those, the above-described I/F identifier contains information on the switch to which the link is connected, and the band contains information showing a communication speed handled by the switch. The I/F attribute contains information indicating attribute of the link that is connected to the switch, and the I/F trouble contains information on a trouble occurred on the link that is connected to the switch.

The main signal I/F part 13 is configured with a communication connector and the like, which interfaces the switched part 12 of the own apparatus 10 with the switch parts 12 of the adjacent communication apparatuses 10 via the #1-#N main signal physical channels 130.

Next, described are functions of the apparatus control part 11 when the control software of the apparatus control part 11 and the control software of the switch part 12 are being operated.

FIG. 4 shows a functional block diagram when the control software installed in the communication apparatus of the first exemplary embodiment is being operated. By operating the control software of the apparatus control part 11, the communication apparatus 10 creates a control packet transmitting/receiving device 31, a routing protocol device 32, a signaling protocol device 33, a link managing protocol device 34, a path managing device 35, a resource managing device 36, and a path order control device 37 as shown in FIG. 4. Further, by operating the control software of the switch part 12, the communication apparatus 10 creates a switch managing device 41 and an I/F managing device 42.

The control packet transmitting/receiving device 31 transmits and receives recovery signaling (will be described later) as a control message, for example, between the own apparatus and the adjacent communication apparatus via the control network 20. Further, the above-described routing protocol device 32 exchanges routing information between a plurality of adjacent communication apparatuses 10.

The signaling protocol device (held path information acquiring device) 33 includes a function of processing the setting of a path resource according to a request. That is, the signaling protocol device 33 starts transmission of a restart completion notification (Hello message) to the apparatus control parts 11 of the adjacent communication apparatuses 10 of #1, #3, #4, and #5 via the control packet transmitting/receiving device 31. Upon receiving a plurality of pieces of recovery signaling (RS1) from the #1, #3, #4, and #5 communication apparatuses 10 via the control packet transmitting/receiving device 31 (step S43, step S44), the signaling protocol device 33 requests a resource information checking request 1 to the resource managing device 36 to check whether or not the resource information in the recovery signaling (RS1) is consistent with the path information that is set prior to the restart.

The link managing protocol device 34 has a function of managing the main signal physical channel 130 and the control channel 16. Further, the path managing device 35 manages the path information that is processed by the signaling protocol device 33.

The resource managing device 36 has a function of managing the link information that is processed by the link managing protocol device 34. That is, upon receiving the I/F information inputted from the I/F managing device 42, the resource managing device 36 outputs a switch connection information acquiring request to the switch managing device 41. Further, the resource managing device 36 reads out the address information written in the setting information list that is stored in the nonvolatile storing part 113*a*, and then generates link information based on the acquired I/F information, the switch information, and the address information. Thereafter, the resource managing device 36 stores the link information list 112*c* to which the generated link information is written in the volatile storing part 112, and rebuilds the link information.

Further, the resource managing device 36 outputs a notification to the signaling protocol part 34 indicating that rebuilding of the link information has been completed. When the path identifier written to the inputted resource information matches with the path identifier (see FIG. 3F) in the switch information written to the switch information list 123*a* that is stored in the nonvolatile storing part 123, the resource managing device 36 recognizes that it is consistent with the path information that is set prior to the restart, and transmits an order control request for determining the order of the paths to be rebuilt to the path order control device 37.

The path order control device 37 has a function of controlling the order of the paths for rebuilding the path information, when the communication apparatus 10 or the control software is restarted.

The above-described communication apparatus 10 executes the control software of the switch part 12 to set the switch managing device 41 and the I/F managing device 42.

Out of those devices, the switch managing device 41 manages the switch information. That is the switch managing device 41 reads out the switch information written in the switch information list 123*a* that is saved in the nonvolatile storing part 123, and outputs the switch information to the resource managing device 36.

Further, the I/F managing device 42 manages the I/F information. That is, the I/F managing device 42 reads out the I/F information from the I/F information list 123*b* that is stored in the nonvolatile storing part 123, and outputs the I/F information to the resource managing device 36.

Next, actions of the communication apparatus 10 according to the first exemplary embodiment will be described.

First, the outline and the important points of the actions of the communication apparatus 10 will be described. Thereafter, those will be described thoroughly in detail.

First, for restarting the communication apparatus 10 according to the first exemplary embodiment, there are following steps to be executed: a first step for restarting the apparatus control part 11 that is provided to the communication apparatus; a second step for retaining the I/F information stored in the storing part of the switch part 12 that is provided side by side with the apparatus control part 11, and the path information and the like sent from the adjacent apparatus; and a third step for rebuilding information of a plurality of paths and the like lost from the storing part of the apparatus control part 11 at the time of restart and the like into information of a plurality of paths that are related to each other as an original state based on the retained information.

With this, it is possible to recover the path information and the like by utilizing, in a well-ordered manner, the connection state of the switch circuit part 122 stored in the nonvolatile storing part 123 of the switch part 12 and the path information and the like from the adjacent apparatuses. Therefore, the path information and the like can be recovered smoothly and promptly without going through an ineffective work.

When executing the third step described above, the path order control device 37 (see FIG. 4) provided to the apparatus control part 11 operates effectively based on the defining information set in advance for defining the order of rebuilding the paths, so that the information of the plurality of paths and the like can be rebuilt to the original state.

Further, when executing the third step, the physical I/F information is executed first. Then, the information of the plurality of related paths is rebuilt in order according to the defining information set in advance for defining the priority order for rebuilding the paths.

Further, a plurality of paths in a hierarchical relation in which the higher layer path utilizes the lower layer path are considered the targets as the information of the plurality of related paths in the third step described above. The plurality of paths in such hierarchical relation are rebuilt to the original state.

Furthermore, a plurality of paths in a relation of a currently used path and its reserved path are considered the targets as the information of the plurality of related path in the third step described above. The plurality of paths in such relation of the currently used path and the reserved path are also rebuilt to the original state.

Further, in the communication system of FIG. 1 according to the exemplary embodiment, when rebuilding the path information of the path that transmits the user traffic, there is executed a control to transmit the user traffic to the network that has a hierarchical structure in which the higher layer path is subordinate to the lower layer path, and each communication apparatus executes a control to transmit/receive the control message between the communication apparatuses via the control network. In that case, after the restart of the above-described communication apparatus 10, the apparatus control part 11 of the communication apparatus 10 generates the link information of before the restart for specifying all the adjacent communication apparatuses 10 based on the I/F information stored in advance for showing the physical information of the paths and the switch information indicating the state of the switches connected to the communication channels that configure the paths, and acquires, via the control network 20, the held path information held in the communication apparatuses from all the adjacent communication apparatuses 10 written in the generated link information. Then, the apparatus control part 11 determines the order of the paths in such a manner that the lower layer path comes first and the higher layer path comes thereafter when generating the path information based on the order defining information that is set separately in advance for defining the path order for building the path information. Then, the apparatus control part 11 generates the above-described path information based on the determined path order and the held path information that is acquired earlier.

Thus, when generating the path information with the exemplary embodiment, the path order is determined in such a manner that the lower layer path comes first and the higher layer path comes thereafter based on the order defining information stored in advance. Therefore, even if there is a trouble occurred in the communication apparatus, it becomes possible to securely recover the path information thereafter.

This will be described in more detail.

First, when the apparatus control part 11 is restarted, the path information, the topology information, and the link information stored in the volatile storing part 112 under a normal operation are diminished. Thus, at the time of restart, it is necessary to rebuild those pieces of information. It is necessary to rebuild the link information prior to rebuilding the path information and the topology information. The path information and the topology information can be rebuilt in an arbitrary order or simultaneously. The actions of the communication apparatus according to the exemplary embodiment will be described in order of (1) Action for Rebuilding Link Information and (2) Action for Rebuilding Path information after Rebuilding Link Information. The explanation of the rebuilding action of the topology information will be omitted since it is the same action except that the topology information written to the topology information list is the identification information of the communication apparatus written to link information list, and it can be generated easily by using the link information once the link information is built.

(1) Regarding Action for Rebuilding Link Information

FIG. 5 is a sequence chart showing the action of the communication apparatus 10 according to the first exemplary embodiment when rebuilding the link information. As shown in FIG. 5, when the communication apparatus 10 is restarted (T1: restart), the resource managing device 36 outputs an I/F information acquiring request to the I/F managing device 42 (step S10). Upon this, the I/F managing device 42 reads out the I/F information from the I/F information list 123b that is stored in the nonvolatile storing part 123, and outputs the I/F information to the resource managing device 36 (step S11).

Upon receiving the I/F information inputted from the I/F managing device 42, the resource managing device outputs a switch connection information acquiring request to the switch managing device 41 (step S12). With this, the switch managing device 41 reads out the switch information written to the switch information list 123a that is saved in the nonvolatile storing part 123, and outputs the switch information to the resource managing device 36 (step S13).

Then, the resource managing device 36 reads out the address information written to the setting information list that is stored in the nonvolatile storing part 113. Thereafter, the resource managing device 36 generates the link information based on the acquired I/F information, the switch information, and the address information. Then, the resource managing device 36 stores the link information list 112c to which the generated link information is written in the volatile storing part 112, and rebuilds the link information (T2: link information rebuilding completed).

That is, the resource managing device 36 sets the I/F identifier, the band, the I/F attribute, and the I/F trouble in the acquired I/F information as the connected-link identifier, the link band, the link attribute, and the link trouble, respectively, which configure the link information. Further, the resource managing device 36 sets the connection identifier in the acquired switch information as the link identifier that configures the link information. When there are the IN connection I/F, the OUT connection I/F, the IN-LABEL of own apparatus, and the OUT-LABEL of own apparatus contained therein, the resource managing device 36 writes in the use information that the link is used. Further, the resource managing device 36 generates the link information by using the acquired address information as the link address that configures the link information.

(2) Regarding Action for Rebuilding Path Information

FIG. 6 is a sequence chart showing actions of the communication apparatus according to the first exemplary embodiment when rebuilding the path information. FIG. 7 is a flowchart showing the action of the communication apparatus according to the first exemplary embodiment when determining the path order. Now, described is the action of the #2 communication apparatus 10 for rebuilding the path information of the three paths, P100, P200, and P201 after completing rebuilding of the link information. The apparatus control part 11 of the #4 communication apparatus is a logical adjacent device that is called FA (Forwarding Adjacency) to which the path P100 is directly connected.

As shown in FIG. 6, when rebuilding of the link information is completed (T100: rebuilding of the link information completed), the resource managing device 36 outputs a notification to the signaling protocol part 34 indicating that the rebuilding of the link information has been completed (step S40). The signaling protocol device starts transmission of a restart completion notification (Hello message) to the apparatus control parts 11 of the adjacent communication apparatuses 10 of #1, #3, #4, and #5 via the control packet transmitting/receiving device 31 (step S41, step S42). Thereafter, upon detecting the Hello message received via the control network 20 and the control channel 16, the respective apparatus control parts 11 of the adjacent communication apparatuses 10 of #1, #3, #4, and #5 transmit, to the #2 communication apparatus 10, the recovery signaling (RS1) for the path that is necessary to be rebuilt via the control channel 16 and the control network 20.

Upon receiving a plurality of pieces of recovery signaling (RS1) from the #1, #3, #4, and #5 communication apparatuses 10 via the control packet transmitting/receiving device 31 (step S43, step S44), the signaling protocol device 33 of the #2 communication apparatus 10 sends a resource information checking request 1 to the resource managing device 36 to check whether or not the resource information in the recovery signaling (RS1) is consistent with the path information that is set prior to the restart (step S45).

When the path identifier written to the inputted resource information matches with the path identifier (see FIG. 3F) in the switch information written to the switch information list 123a that is stored in the nonvolatile storing part 123, the resource managing device (link information generating device, path information generating device) 36 recognizes that it is consistent with the path information that is set prior to the restart, and transmits an order control request for determining the order of the paths to be rebuilt to the path order control device 37 (step S46). When there is an inconsistency between the path identifier in the resource information and the path identifier stored in the switch information list 123a, it is treated as an error. When there is no matching information, it is treated as new path information.

After receiving the order control requests for all the paths to be rebuilt, the path order control device 37 executed order determining processing (this processing will be described later) for determining the priority order of the path information to be built by using an order control algorithm to be described later. As a result, the path order control device 37 determines the priority order in order of the path P201, the path P200, and the path P100. Thereafter, the path order control device 37 notifies, to the resource managing device 36, the path P201 that has a priority over others when rebuilding the path information (step S47).

The resource managing device 36 outputs, to the signaling protocol device 33, a resource checking response for the resource checking request inputted earlier for the notified path P201 (step S48). Upon receiving the resource checking response, the signaling protocol device 33 transmits recovery signaling (RS2) to the apparatus control part 11 of the #4 communication apparatus 10 via the control packet transmitting/receiving device 31 (step S49, step S50).

The apparatus control part 11 of the #4 communication apparatus 10 transmits, to the #2 signaling protocol device 33, recovery signaling (RS3) as a response to the recovery signaling (RS2) via the control channel 16 and the control network 20.

Upon receiving the recovery signaling (RS3) from the #4 communication apparatus 10 (step S51, step S52), the #2 signaling protocol device 33 outputs a resource checking request 2 to the resource managing device 36 for inquiring whether or not the response for the recovery signaling transmitted earlier is correct (step S53). With this, the resource managing device 36 stores the path information list 112a containing the path information of the path 201 to the volatile storing part 112 based on the path information contained in the source information. At this point, rebuilding of the path information regarding the path P201 is completed.

The resource managing device 36 sends, to the path order control device 37, a notification indicating that the rebuilding of the path P201 has been completed (step S54). Thereafter, the path order control device 37 refers to the defining information list 113b that is stored in the nonvolatile storing part 113, and notifies the path P200 that has a priority over others to the resource managing device 36 (step S55).

Rebuilding of the path information of the path P200 and path P100 is executed in the same manner hereinafter. For the path P200, the path information is rebuilt by exchanging the recovery signaling with the apparatus control part 11 of the #3 communication apparatus 10 (step S56-step S63). For the path P100, the path information is rebuilt by exchanging the recovery signaling with the apparatus control part 11 of the #5 communication apparatus 10 (step S64-step S70).

Thereafter, when it is notified to the path order control device 37 that rebuilding of the path information of the path P100 has been completed (step S70), it is confirmed that all the paths have been rebuilt. Thereby, the restart processing is ended. Since the #2 communication apparatus 10 placed in the middle of the path P100 is restarted, the resource checking response is sent to the signaling protocol device 33 after the request for checking the resource (step S61). Thus, the signaling protocol device 33 executes the processing for transmitting recovery signaling (RS4, not shown).

Next, described is the above-mentioned order determining processing for determining the priority order of the paths with which path information is to be rebuilt. FIG. 7 is a flowchart showing the action for determining the priority order of the paths with which path information is to be rebuilt.

After rebuilding the link information first in the manner described above and then receiving the order control requests from the resource managing device 36 (S80), the path order control device 37 judges whether or not the order control requests for all the paths have been inputted (step S81). When judging that the order control requests for all the paths have not been inputted yet (step S81; NO), the path order control device 37 shifts the processing to step S80, and waits until the order control requests for all the paths are inputted.

In the meantime, when judging that the order control requests for all the paths have been inputted (step S81; YES), the path order control device 37 refers to the defining information written in the defining information list 113b of the nonvolatile storing part 113 (step S82), and stores those in a work area (not shown) of the volatile storing part memory 112 in the priority order, i.e. in order of the path P201, the path P200, and the path 2100 (step S83). When the path is a reserved path and the lower layer path, it is handled as a high priority path based on the definition 1 and definition 2.

Neat, the path order control device 37 notifies, to the resource managing device 36, the path that has the highest priority order stored in the work area (step S84). Thereafter, the path order control device 37 judges whether or not a completion notification has been inputted from the resource managing device 36 (step S85). When judging that the completion notification has not been inputted (step S85; NO), the path order control device 37 waits until the completion notification is inputted. In the meantime, when judging that the completion notification has been inputted (step S85; YES), the path order control device 37 deletes the corresponding path from the work area (step S86). Thereafter, the path order control device 37 judges whether or not the path is stored in the work area (step S87).

When judging that the path is stored in the work area (step S87; YES), the path order control device 37 recognizes that the path order control has not been completed yet, and shifts to step S84 to continue the operation in the same manner as described above. In the meantime, when judging that the path is not stored in the work area (step S87; NO), the path order control device 37 recognizes that the order determining processing for determining the priority order of the paths with which path information is to be rebuilt has been completed, and ends the processing.

With the exemplary embodiment, it is possible to recover the paths to be in a proper state that is the same as the state of before the restart, even when the plurality of paths to have the information rebuilt are in a hierarchical relation or in a current-use/reserved-use relation.

Second Exemplary Embodiment

FIG. 8 shows a functional block diagram showing functions of a communication apparatus according to a second exemplary embodiment.

As in the case of the communication apparatus 10 of the first exemplary embodiment described above, communication apparatus 10 of the second exemplary embodiment includes an apparatus control part, a switch part, and a main signal I/F part. The same reference numerals as those of the communication apparatus of the above-described first exemplary embodiment are applied as the reference numerals for the communication apparatus of the second exemplary embodiment, the structural parts thereof, and each structural part shown in the functional block diagram.

The communication apparatus 10 of this exemplary embodiment is placed as communication apparatuses 10 of #1-#5 in an optical network similar to the hierarchical network as that of the first exemplary embodiment (FIG. 1) described above.

As shown in FIG. 2, the #1-#5 communication apparatuses 10 include an apparatus control part 11, a switch part 12, and a main signal I/F part 13. The apparatus control part 11 controls the apparatus itself, and also exchanges control messages with the apparatus control parts 11 of other communication apparatuses 10 via a control network 20. The apparatus control part 111 includes a protocol processing part 111, a volatile storing part 112, a nonvolatile storing part 113, and a control I/F part 114.

The volatile storing part 112 stores a path information list 112a, a link information list 112b, and a topology information list 112c. The nonvolatile storing part 113 stores control software (not shown), a setting information list 113a, and a logical I/F information list 113c (see FIG. 8). A volatile storing part 123 stores control software (not shown), a switch information list 123a, and an I/F information list 123b.

Further, the logical I/F information list 113c contains logical I/F information showing path logical information. Like the I/F information described above, the logical I/F information shows that a higher layer path is subordinate to a lower layer path when building path information of the path that transmits user traffic.

FIG. 8 is a functional block diagram when the control software loaded on the communication apparatus of the second exemplary embodiment according to the invention is executed. By operating the control software of the apparatus control part 11, the communication apparatus 10 creates a control packet transmitting device 31, a routing protocol part 32, a signaling protocol device (held path information acquiring device, trouble information acquiring device, path switching request device) 33, a link managing protocol device 34, a path managing device 35, a resource managing device 36, a logical I/F managing device 38, and an information delaying device 39. Further, by operating the control software of the switch part 12, the communication apparatus 10 creates a switch managing device 41 and an I/F managing device (trouble information writing device, troubled path detecting device) 42.

The logical I/F managing device 38 manages the logical I/F information. When trouble information is written in the I/F information list 123b stored in the nonvolatile storing part 123, the information delaying device 39 rewrites it to a normal value (no trouble) to generate I/F information in which the trouble information is concealed, and outputs the generated I/F information to the resource managing device 36. Further, When trouble information is written in the I/F information list 113c stored in the nonvolatile storing part 113, the information delaying device 39 rewrites it to a normal value (no trouble) to generate logical I/F information in which the trouble information is concealed, and outputs the generated logical I/F information to the resource managing device 36.

The communication apparatus 10 executes the control software of the switch part 12 to create the switch managing device 41 and the I/F managing device 42.

Next, actions of the communication apparatus according to the second exemplary embodiment will be described. First, the overall basic structures and the important points of the actions of the communication apparatus 10 will be described. Thereafter, those will be described in detail.

The communication apparatus 10 according to the exemplary embodiment is configured to work as follows, when building the path information of the paths that transmit user traffic. That is, the communication apparatus 10 controls transmission of the user traffic to the network that has a hierarchical structure in which a higher layer path is subordinate to a lower layer path, and controls transmission/reception of the control message between each of the communication apparatuses 10 via the control network.

Further, the apparatus control part 11 of the communication apparatus 10 has a function which, after restarting the communication apparatus 10: generates link information of before the restart for specifying all the adjacent communication apparatuses based on the I/F information showing the path physical information that is stored separately in advance, the logical I/F information showing the path logical information, and the switch information showing the state of the switches connected to the communication channels that configures the paths; acquires, via the control network 20, the held path information held by the communication apparatuses from the adjacent communication apparatuses that are written in the generated link information; and generates the path information thereafter regardless of whether or not the path information of lower layer path is formed in advance.

Since the link information generating device generates the link information of before the restart for specifying all the adjacent communication apparatuses based on the I/F information, the logical I/F information, and the switch information, the link information contains logical information regarding the link. Therefore, even if the held path information of the higher layer path is acquired earlier than the held path information of the lower layer path, it is possible to generate the higher layer path information before the lower layer path information by using the link information that contains the logical information. That is, it is possible to generate the path information in order of acquiring the held path information regardless of the hierarchical order.

With the communication control method described above, when trouble information is written in the above-described I/F information after restarting the communication apparatus described above, it is rewritten to a normal value to generate the I/F information in which the trouble information is concealed. Further, when trouble information is written in the above-described logical I/F information, it is rewritten to a normal value to generate the logical I/F information in which the trouble information is concealed. Then, the link information of before the restart for specifying all the adjacent communication apparatuses is to be generated based on the I/F information in which the trouble information is rewritten to the normal value to conceal it, the logical I/F information in which the trouble information is rewritten to the normal value to conceal it, and the switch information.

Further, with the communication control method, the generated path information contains path attribute information which shows attribute of the currently used path and attribute of the reserved path that is used when there is a trouble occurred in the currently used path. The communication control method may be configured to: acquire trouble information indicating that there is a communication trouble occurred in the network, for example, from the adjacent communication apparatuses; write the acquired trouble information to the storing device; generate the path information, and then specify information of the link where the trouble is generated, based on the trouble information written to the storing device; detect the path that is affected by the trouble from the specified link information; transmit, via the control network, a request for switching the currently used path to the reserved path to the adjacent communication apparatus to which the path with the detected trouble is connected.

Since the path information includes the currently used path and the reserved path, it is possible to switch the currently used path to the reserved path for the adjacent communication apparatus 10 to which the path with the trouble detected by the troubled path detecting device is connected, when there is a trouble occurred in the path after the path information is rebuilt.

Those actions will be described hereinafter in a more concrete manner.

(1) Regarding Action for Rebuilding Link Information

FIG. 9 is a sequence chart showing the action of the communication apparatus 10 according to the second exemplary embodiment when rebuilding the link information. When the communication apparatus 10 is restarted (T1: restart), the resource managing device 36 outputs an I/F information acquiring request to the I/F managing device 42 (step S90). Upon this, the I/F managing device 42 reads out the I/F information that is stored in the nonvolatile storing part 123, and outputs the I/F information to the information delaying device 39 (step S91).

Upon receiving the I/F information, the information delaying device 39 checks an I/F trouble field in the I/F information (see FIG. 3G). When the field indicates a trouble state, the information delaying device 39 rewrites it to a normal value to generate I/F information in which the trouble information is concealed, and outputs the I/F information with the concealed trouble information to the resource managing device 36 as an I/F information acquiring response. In the meantime, when the I/F trouble field does not indicate a trouble state, the information delaying device 39 outputs the I/F information inputted from the I/F managing device 42 as it is in the original state to the resource managing device 36 as an I/F information acquiring response (step S92).

Then, the resource managing device 36 outputs a logical I/F information acquiring request to the logical. I/F managing device 38 (S93). The logical I/F managing device 38 outputs, to the information delaying device 39, the logical I/F information of the nonvolatile storing part 123 read out after the restart (step S94).

Upon receiving the logical I/F information, the information delaying device (concealed I/F information generating device, concealed logical I/F information generating device) 39 checks an I/F trouble field in the logical I/F information (see FIG. 8B). When the field indicates a trouble state, the information delaying device 39 rewrites it to a normal value to generate logical I/F information in which the trouble information is concealed, and outputs the logical I/F information with the concealed trouble information to the resource managing device 36 as a logical I/F information acquiring response. In the meantime, when the logical I/F trouble field does not indicate a trouble state, the information delaying device 39 outputs the logical I/F information inputted from the logical I/F managing device 38 as it is in the original state to the resource managing device 36 as a logical I/F information acquiring response (step S95).

At last, the resource managing device 36 issues a switch connection information acquiring request to the switch managing device 35 (step S96). With this, the switch managing device 35 returns the switch connection information that is saved in the nonvolatile storing part 123 as a switch connection information acquiring response (step S97).

As in the case of the resource managing device 36 of the communication apparatus of the first exemplary embodiment, the resource managing device 36 generates the link information list 112b including no trouble state to be stored in the volatile storing part 112. As a result, rebuilding of the link information containing both physical and logical information is completed.

(2) Regarding Action for Rebuilding Path Information

FIG. 10 is a sequence chart showing actions of the communication apparatus according to the second exemplary embodiment when rebuilding the path information after rebuilding the link information. The apparatus control part 11 of the #4 communication apparatus is a logical adjacent device that is called FA (Forwarding Adjacency) to which the path P100 is directly connected. When rebuilding of the link information is completed (T100: rebuilding of the link information completed), the resource managing device 36 outputs a notification to the signaling protocol device 33 indicating that the rebuilding of the link information has been completed (step S100).

The signaling protocol device 33 starts transmission of a restart completion notification (Hello message) to the apparatus control parts 11 of the adjacent communication apparatuses 10 of #1, #3, #4, and #5 via the control packet transmitting/receiving device 31 (step S101, step S102).

Thereafter, upon detecting the Hello message, each of the respective apparatus control parts 11 of the adjacent communication apparatuses 10 of #1, #3, #4, and #5 transmits, the recovery signaling (RS1) for the paths that are necessary to be rebuilt (step S103-Step S105).

Upon receiving the recovery signaling message (RS1), the control packet transmitting/receiving parts 31 of the communication apparatuses 10 of #1, #3, #4, and #5 output the message (RS1) to the signaling protocol device 33 (step S106-step S108).

The signaling protocol device 33 sends a resource checking request to the resource managing device 36 to check whether or not the resource requested by the message (RS1) is consistent with the path information that is set before the restart (S109-S111). When it matches with the path identifier of the switch connection information notified in the rebuilding action of the link information, the resource managing device 36 returns a resource checking response (S112-S114).

Thereafter, the signaling protocol device 33 transmits recovery signaling (RS2) to the communication apparatuses 10 of #4, #3, and #5 via the control packet transmitting/receiving device 31 (step S115-step S120).

The adjacent communication apparatuses 10 of #1, #3, #4, and #5 transmit recovery signaling (RS3) as a response to the recovery signaling (RS2) (step S121-step S123).

Thereafter, when the recovery signaling (RS3) is inputted via the control packet transmitting/receiving part 31 (step S124-Step S126), the signaling protocol part 33 outputs a resource checking request to the resource managing device 36 (step S127-step S129).

When the resource checking request is inputted via the control packet transmitting/receiving device 31 and the signaling protocol device 33, the resource managing part 36 checks whether or not the connected target is correct based on the switch connection information. When it is confirmed as the right connected target, rebuilding of the path information is completed (T101: rebuilding of whole path information completed).

For rebuilding the information of the three paths P100, P200, and 2201 in FIG. 10, it is possible to execute the processing in order of the arrival of the recovery signaling (RS1) from the apparatus control parts 11 of the adjacent communication apparatuses 10. Thus, the order control as required in the communication apparatus according to the first exemplary embodiment of the present invention is unnecessary. Since the #2 communication apparatus 10 placed in the middle of the path P100 is restarted, the resource checking response is sent to the signaling protocol device 33 after the request for checking the resource (step S124), although not shown. Thus, the signaling protocol device 33 executes the processing for transmitting recovery signaling (RS4, not shown)

Next, described is an action of the case where there is a trouble occurred in a channel connecting between adjacent communication apparatuses after the communication apparatus is restarted and the path information is rebuilt.

FIG. 11 is a sequence chart showing an action of the case where there is a trouble such as a cut in a fiber that connects between the #3 communication apparatus and the adjacent #4 communication apparatus during restart of the #2 communication apparatus. When a trouble occurs in the fiber, the I/F managing device 42 of the #4 communication apparatus 10 detects trouble information.

Thereafter, the #2 communication apparatus 10 receives a notification of the trouble information by using an alarm transmission mechanism such as SONET/SDH AIS (Alarm Indication Signal), and the trouble information is written to the I/F information list 123b of the nonvolatile storing part 123. It is assumed here that the resource managing device 36 has already received a notification from the information delaying device 39 that the trouble state indicates a proper value (no trouble), before the trouble information is inputted.

When the resource managing device 36 outputs a notification to the information delaying device 39 indicating that rebuilding of the paths has been completed (step S130), the information delaying device 39 notifies the trouble information of the link with the trouble to the resource managing device 36 (step S131). The resource managing device 36 detects the path that has affected by the trouble of the link, and notifies the path to the signaling protocol device 33 (step S132).

The signaling protocol device 33 transmits switching signaling for requesting switching of the paths to the apparatus control parts 11 of the adjacent communication apparatuses 10 of #1, #3, #4, and #5 via the control packet transmitting part 31 (step S133, step S134). At this point, rebuilding of all the path information has already been completed. Thus, it is possible to execute switching securely without failing the switching to the reserved path.

As described above, it is possible with the second exemplary embodiment to recover the paths to be in a proper state that is the same as the state of before the restart, even when the plurality of paths to have the information rebuilt are in a hierarchical relation or in a current-use/reserved-use relation. Particularly, it is possible with the exemplary embodiment to securely rebuild the plurality of related paths without minding the attribute, i.e. without minding the order for rebuilding the paths, unlike the case of the first exemplary embodiment. Therefore, the building processing of the path information that is executed by the communication apparatus of the first exemplary embodiment can be simplified.

The actions of the exemplary embodiment have been described by referring to the case of the communication apparatus which includes both a hierarchical point of the paths and the branching point of the currently used path and the reserved path. However, the present invention is not limited only to such case. The present invention can also be applied to a communication apparatus which includes either the hierarchical point of the paths or the branching point of the currently used path and the reserved path.

Further, it is possible to apply the communication apparatus according to the first exemplary embodiment even when there is a trouble occurred in a power supply or the like of the apparatus and the entire communication apparatus 10 is restarted, since the switch information list 123a and the I/F information list 123b saved in the switch part 12 are stored in the nonvolatile storing part 123.

Third Exemplary Embodiment

A third exemplary embodiment is configured to execute each control function of the above-described communication apparatus 10 by a computer program. The contents thereof are almost the same contents executed by the communication control actions at the time of restarting the communication apparatus 10 in each of the above-described exemplary embodiments.

That is, the communication control program according the exemplary embodiment is a control program which, when building path information of the path for transmitting user traffic, controls transmission of the user traffic to a network that has a hierarchical structure in which a higher layer path is subordinate to a lower layer path, and controls transmission/reception of control messages between each of the communication apparatuses 10 via a control network. The control program allows a computer to execute: after restarting the above-described communication apparatus 10, a procedure for generating link information of before the restart for specifying all the adjacent communication apparatuses based on the I/F information that is stored separately in advance for showing the path physical information, and the switch information showing the state of the switches connected to the communication channels that configure the paths; a procedure for acquiring, via the control network 20, the held path information held by the communication apparatuses 10 from all the adjacent communication apparatuses 10 that are written in the generated link information; a procedure for determining the path order thereafter in such a manner that the lower layer path comes first and the higher layer path comes thereafter when generating the path information based on order defining information that is set and stored in advance for defining the order of the paths with which path information is to be built; and a procedure for generating the above-described path information based on the determined path order and the held path information acquired earlier.

With this, the path order is determined in such a manner that the lower layer path comes first and the higher layer path comes thereafter when generating the path information based on order defining information that is stored in advance. Therefore, it is possible to execute path information recovery processing promptly and securely after a trouble occurs in the communication apparatus.

Furthermore, the communication control program according the exemplary embodiment is a control program which, when building path information of the path for transmitting user traffic, controls transmission of the user traffic to a network that has a hierarchical structure in which a higher layer path is subordinate to a lower layer path, and controls transmission/reception of control messages between each of the communication apparatuses via a control network. The control program allows a computer to execute: after restarting the communication apparatus, a procedure for generating link information of before the restart for specifying all the adjacent communication apparatuses based on the I/F information that is stored in advance for showing the path physical information, the logical I/f information showing the path logical information, and the switch information showing the state of the switches connected to the communication channels that configure the paths; a procedure for acquiring, via the control network, the held path information held by the communication apparatuses from the adjacent communication apparatuses that are written in the generated link information; and a procedure for generating the path information thereafter regardless of whether or not the path information of lower layer path is formed in advance.

Since the link information generating device generates the link information of before the restart for specifying all the adjacent communication apparatuses based on the I/F information, the logical I/F information, and the switch information, the link information includes logical information regarding the link. Therefore, even if the held path information of the higher layer path is acquired earlier than the held path information of the lower layer path, it is possible to generate the higher layer path information before the lower layer path information by using the link information that contains the logical information. That is, it is possible to generate the path information in order of acquiring the held path information regardless of the hierarchical order.

Like the cases of each exemplary embodiment described above, it is possible with the third exemplary embodiment to recover the information of a plurality of paths that are related to each other to the state of before the restart, even if a trouble occurs in the apparatus control part at the time of restart or the like of the communication apparatus that is connected to the network so that the path information or the like becomes lost.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This applications is based upon and claims the benefit of priority from Japanese patent applications No. 2005-349890, filed on Dec. 2, 2005, the disclosure of which is incorporated herein in its entirety by reference.

BRIEF DESCRIPTION OF THE DRAWINGS

FIG. 1 is a block diagram showing a structure of an optical network in which communication apparatuses of a first exemplary embodiment (and a second exemplary embodiment) according to the invention are used;

FIG. 2 is a block diagram showing a structure of the communication apparatus according to the first exemplary embodiment of the invention;

FIG. 3 is an illustration which describes information stored in a volatile storing part and a nonvolatile storing part shown in FIG. 2;

FIG. 12 is a block diagram showing a network structure in which traditional communication apparatuses are used;

FIG. 13 is a block diagram showing a structure of the communication apparatus shown in FIG. 12;

REFERENCE NUMERALS

Figure 4:
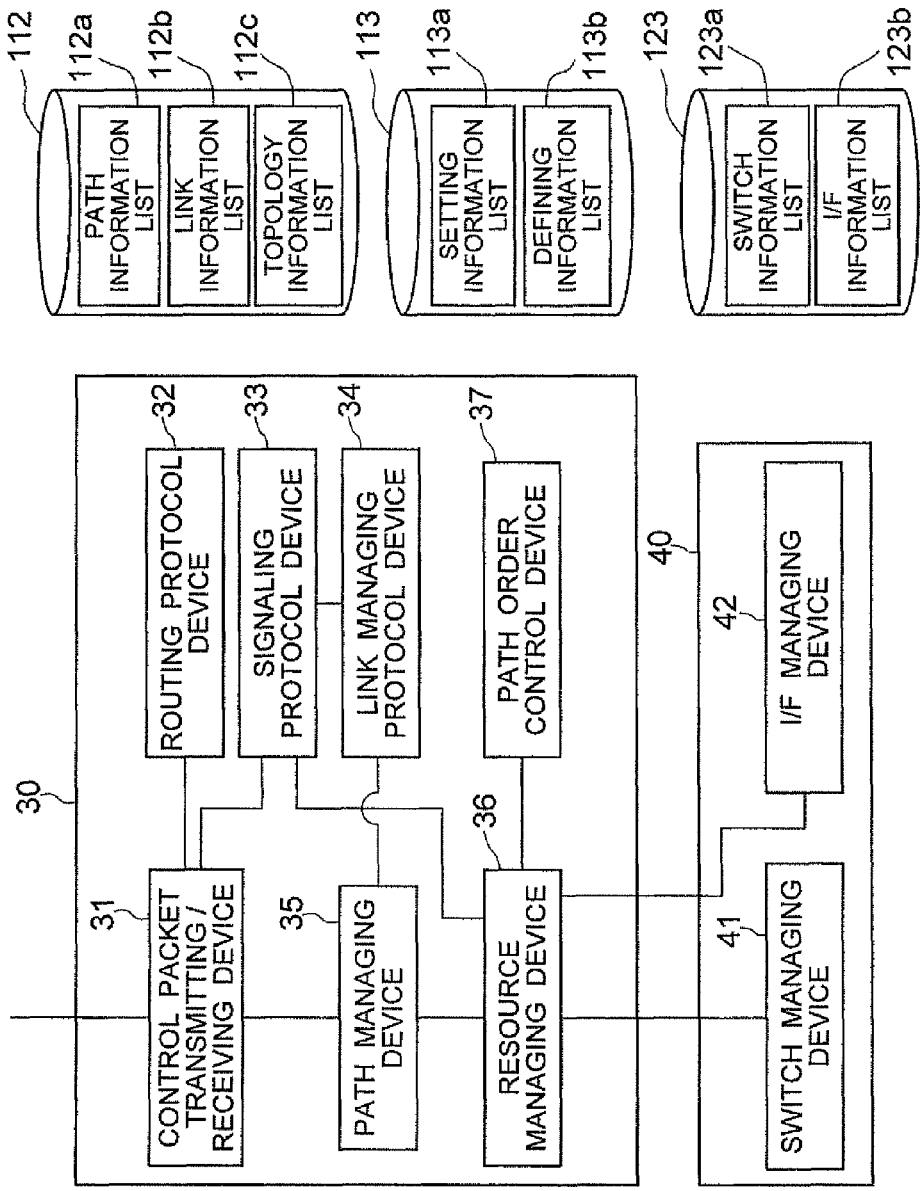
FIG. 4 is a block diagram of functions configured by executing control software.
Figure 5:
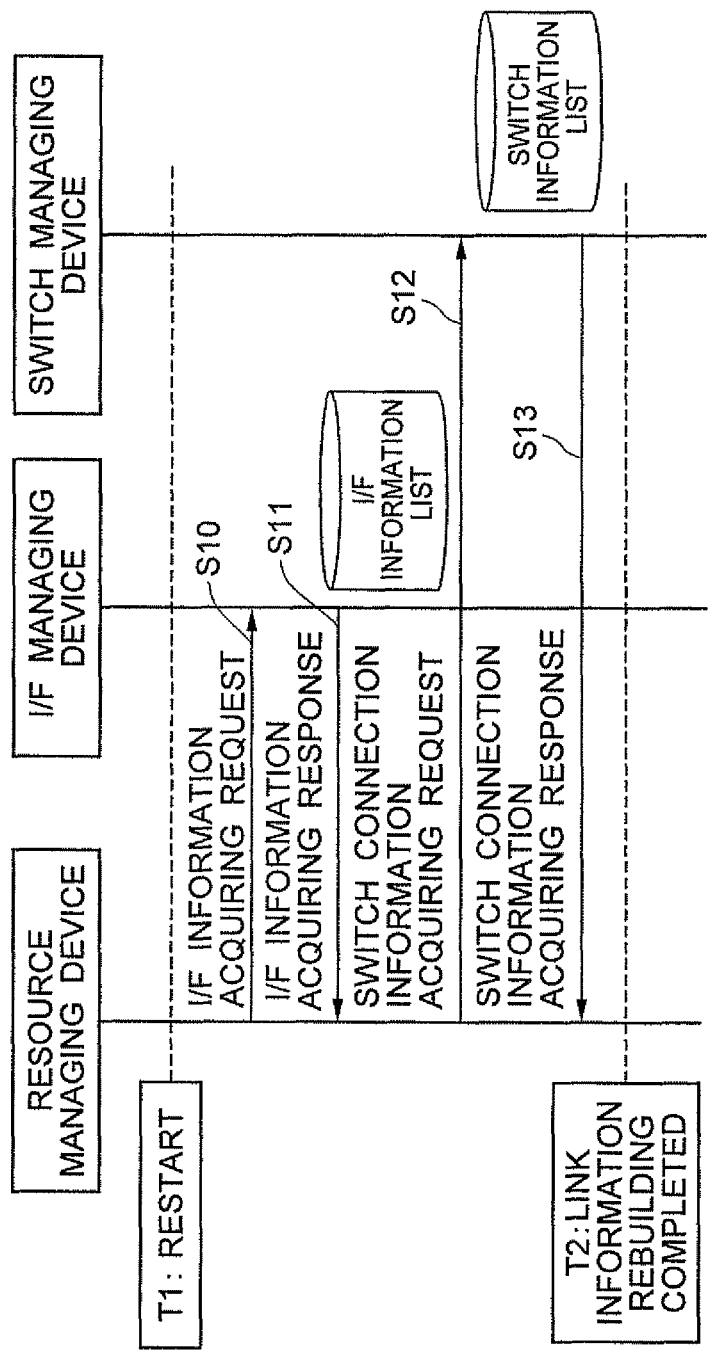
FIG. 5 is a sequence chart showing an action for rebuilding link information executed by the communication apparatus of the first exemplary embodiment according to the invention.
Figure 6:
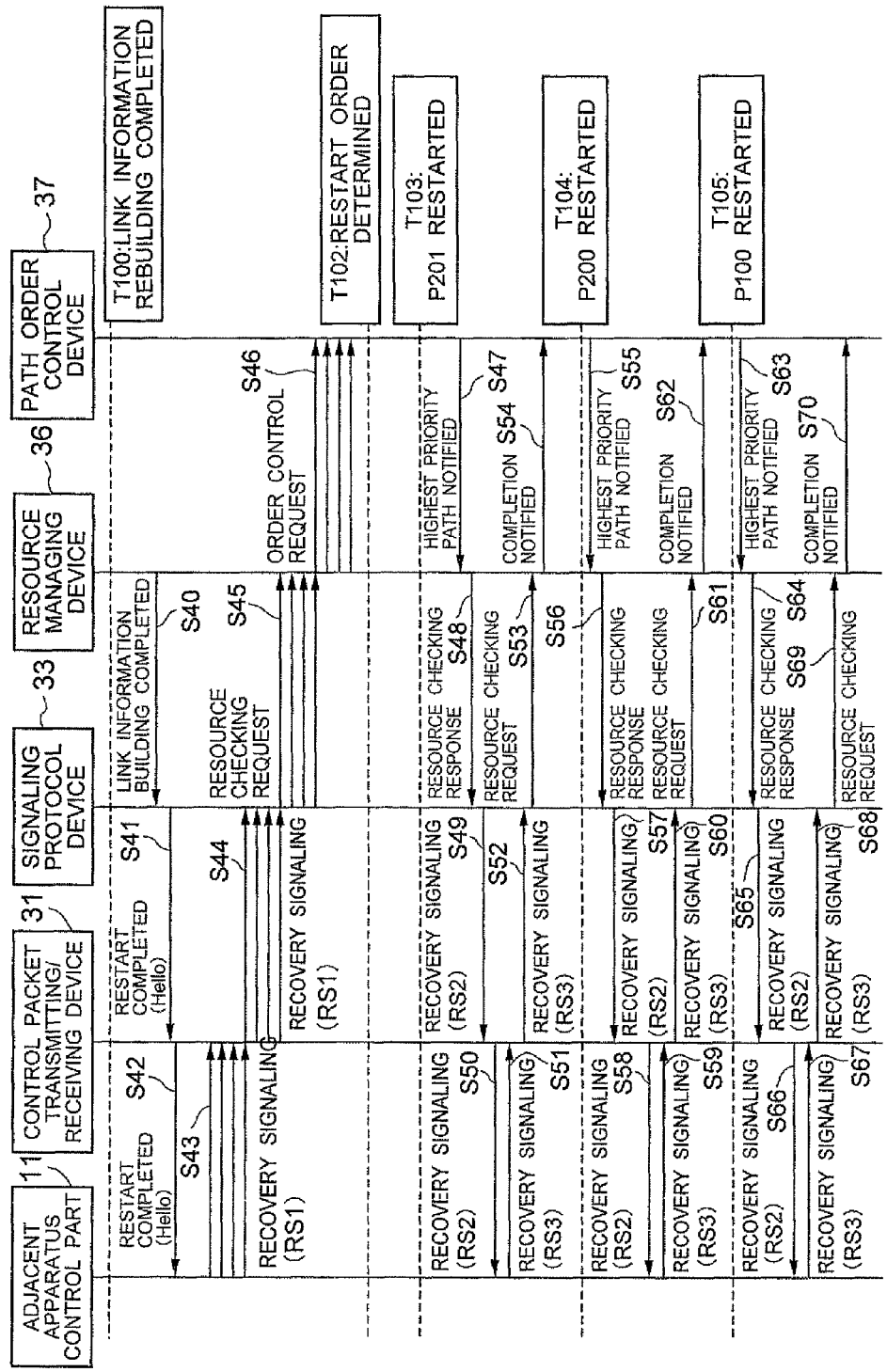
FIG. 6 is a sequence chart showing an action for rebuilding path information executed by the communication apparatus of the first exemplary embodiment according to the invention.
Figure 7:
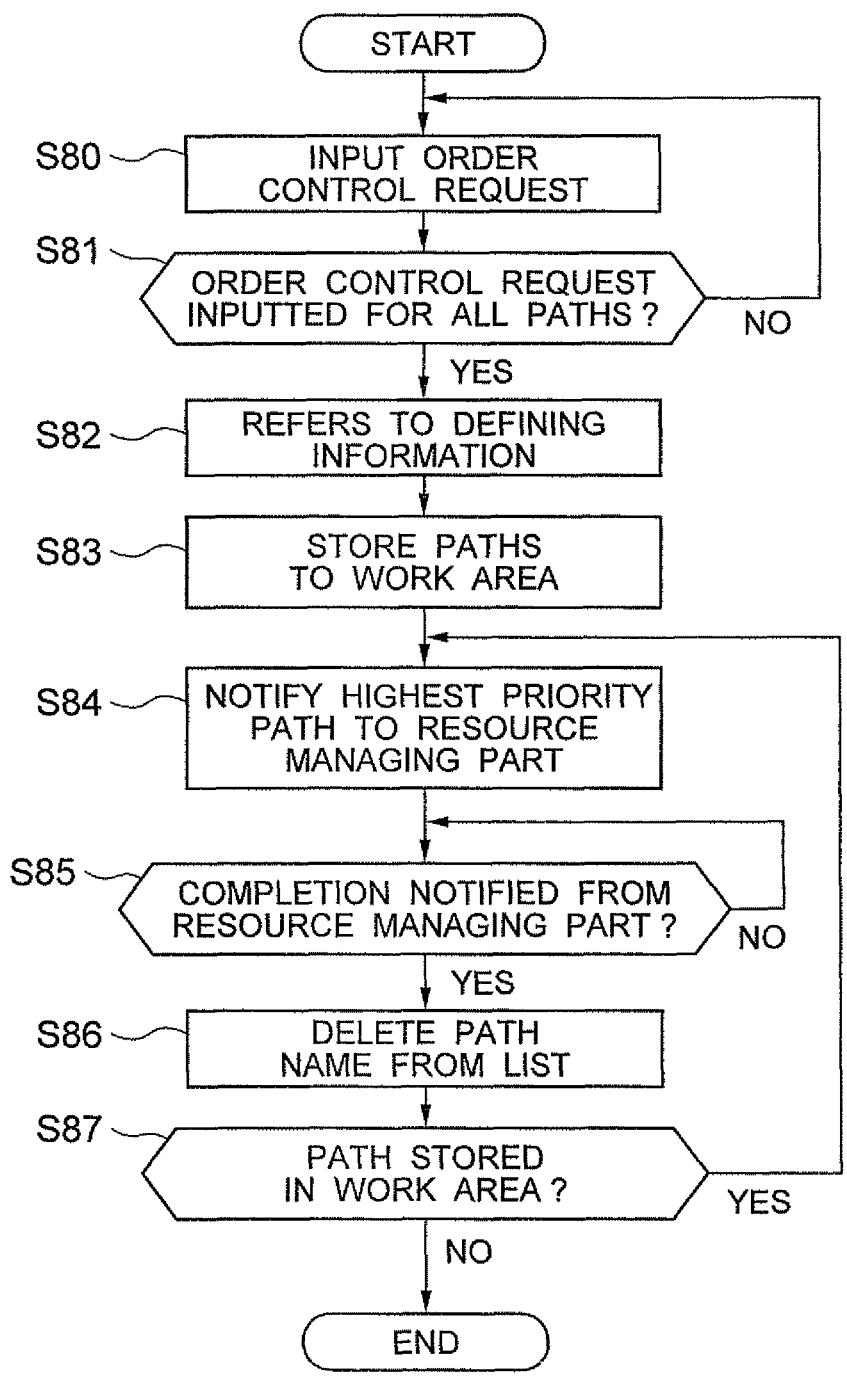
FIG. 7 is a flowchart showing processing executed by a path order control device in the communication apparatus of the first exemplary embodiment according to the invention.
Figure 8:
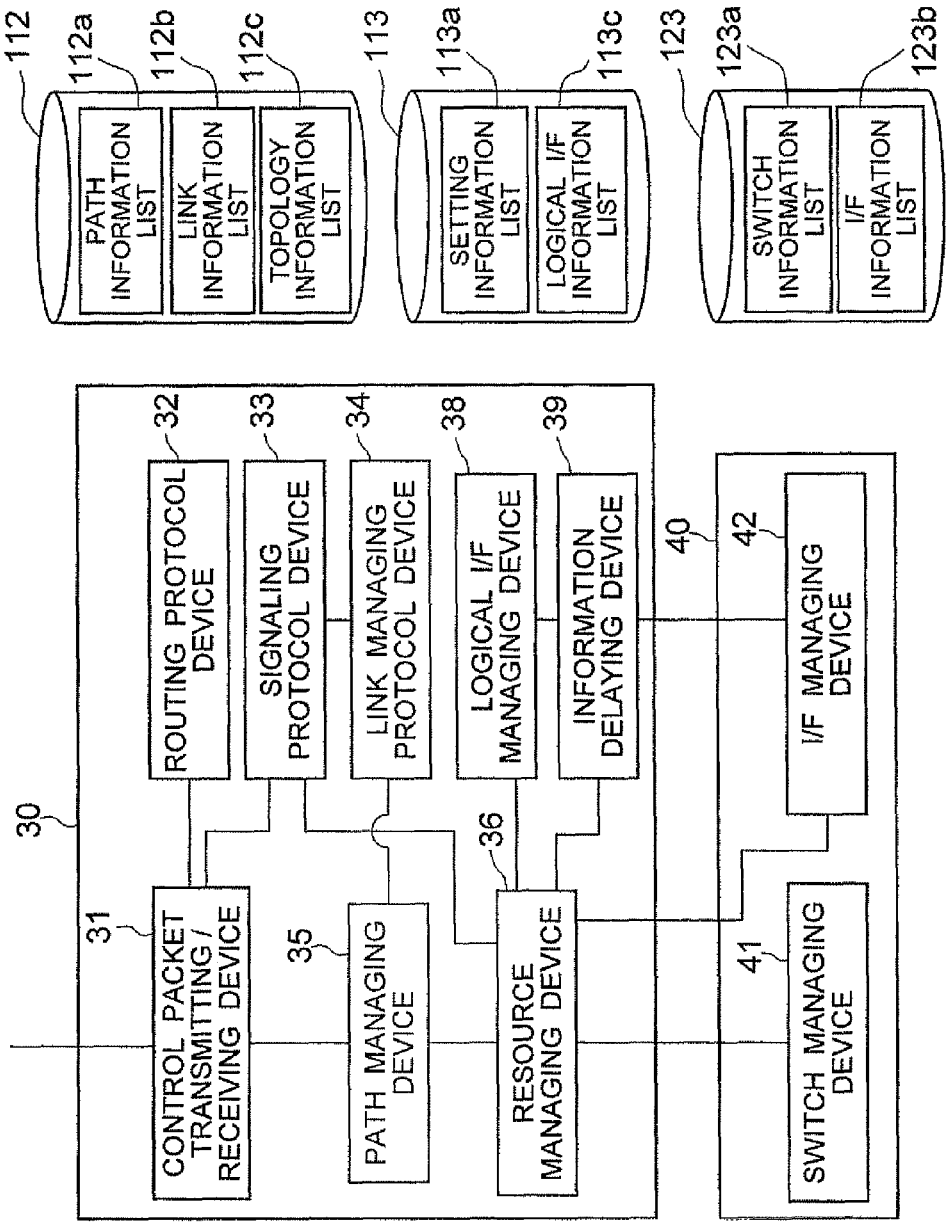
FIG. 8 is a functional block diagram of a communication apparatus according to the second exemplary embodiment of the invention.
Figure 9:
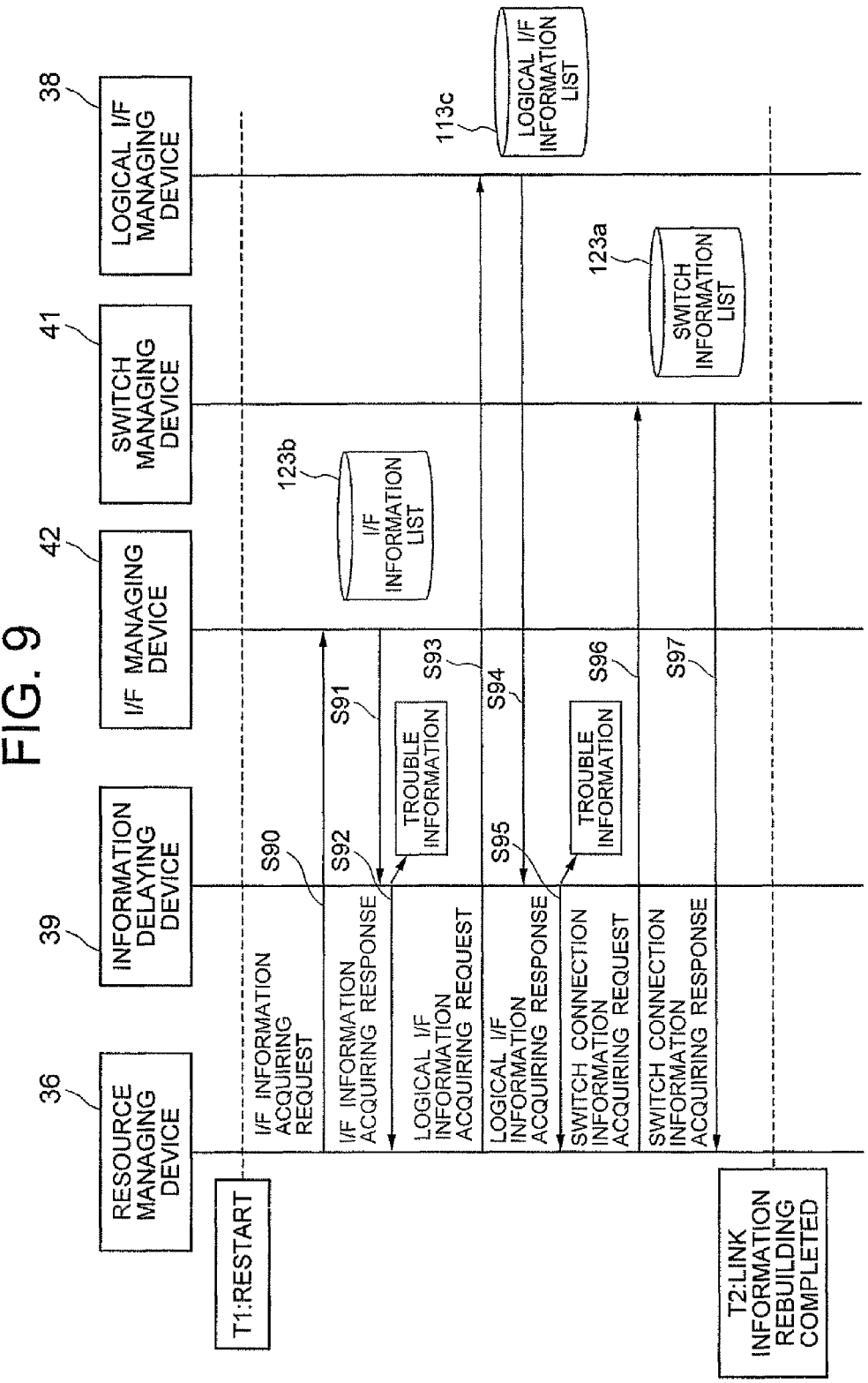
FIG. 9 is a sequence chart showing an action for rebuilding link information executed by the communication apparatus of the second exemplary embodiment according to the invention.
Figure 10:
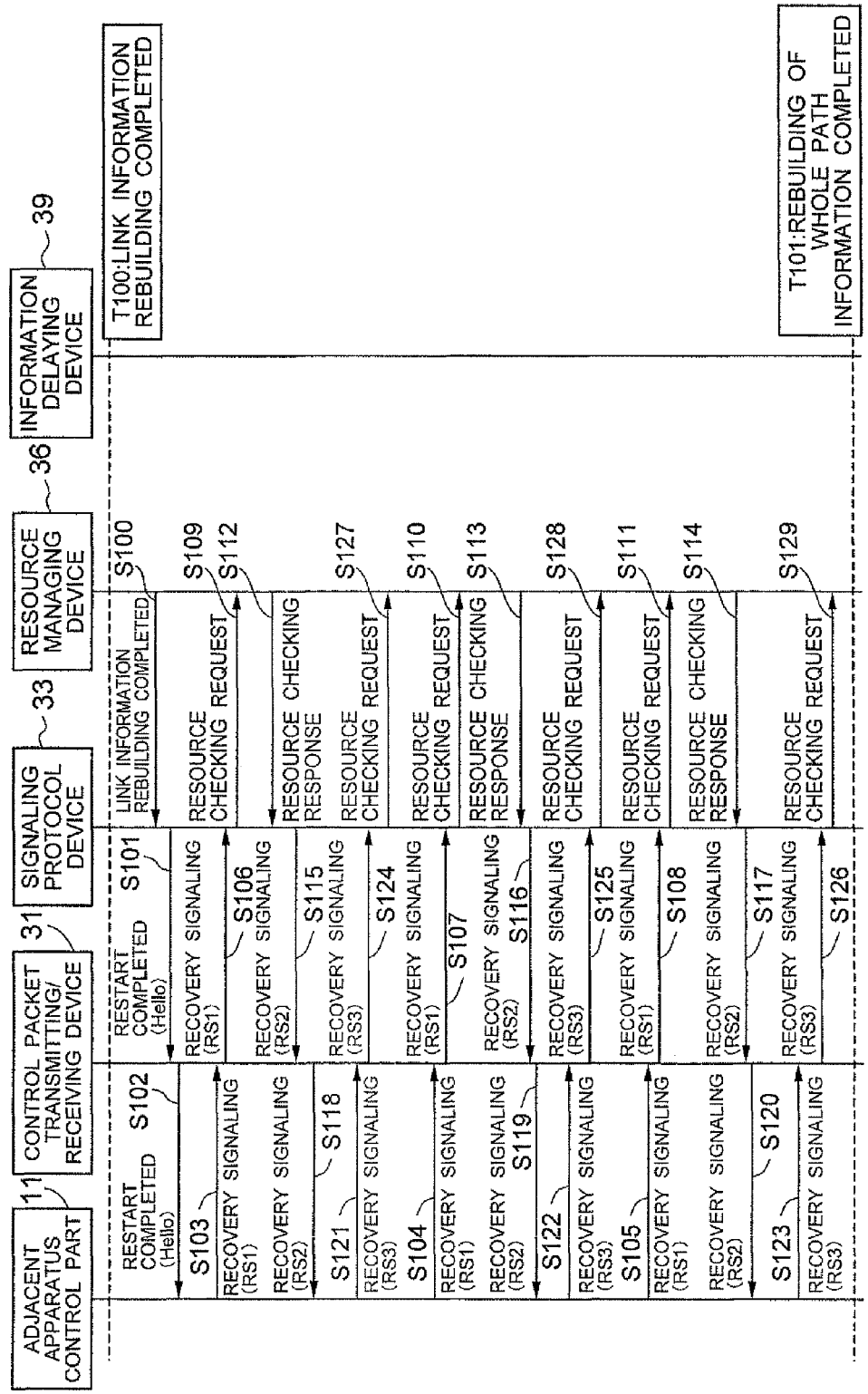
FIG. 10 is a sequence chart showing an action for rebuilding path information executed by the communication apparatus of the second exemplary embodiment according to the invention.
Figure 11:
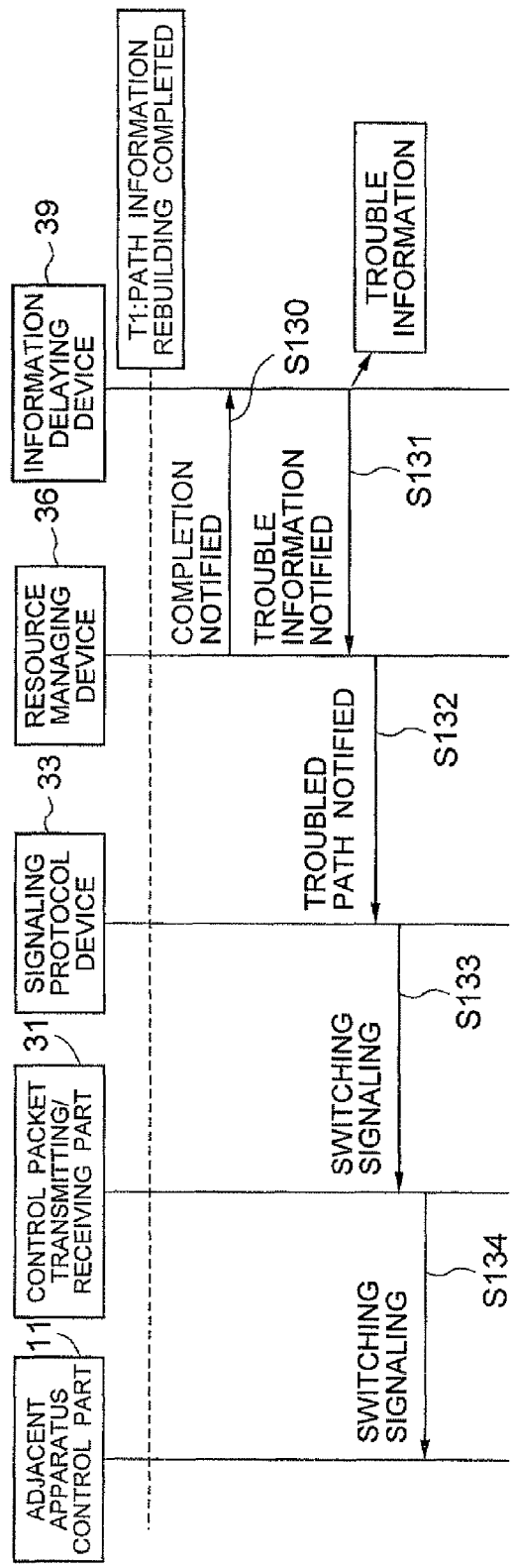
FIG. 11 is a sequence chart showing an action after rebuilding of the path information executed by the communication apparatus of the second exemplary embodiment according to the invention.
Figure 14A:
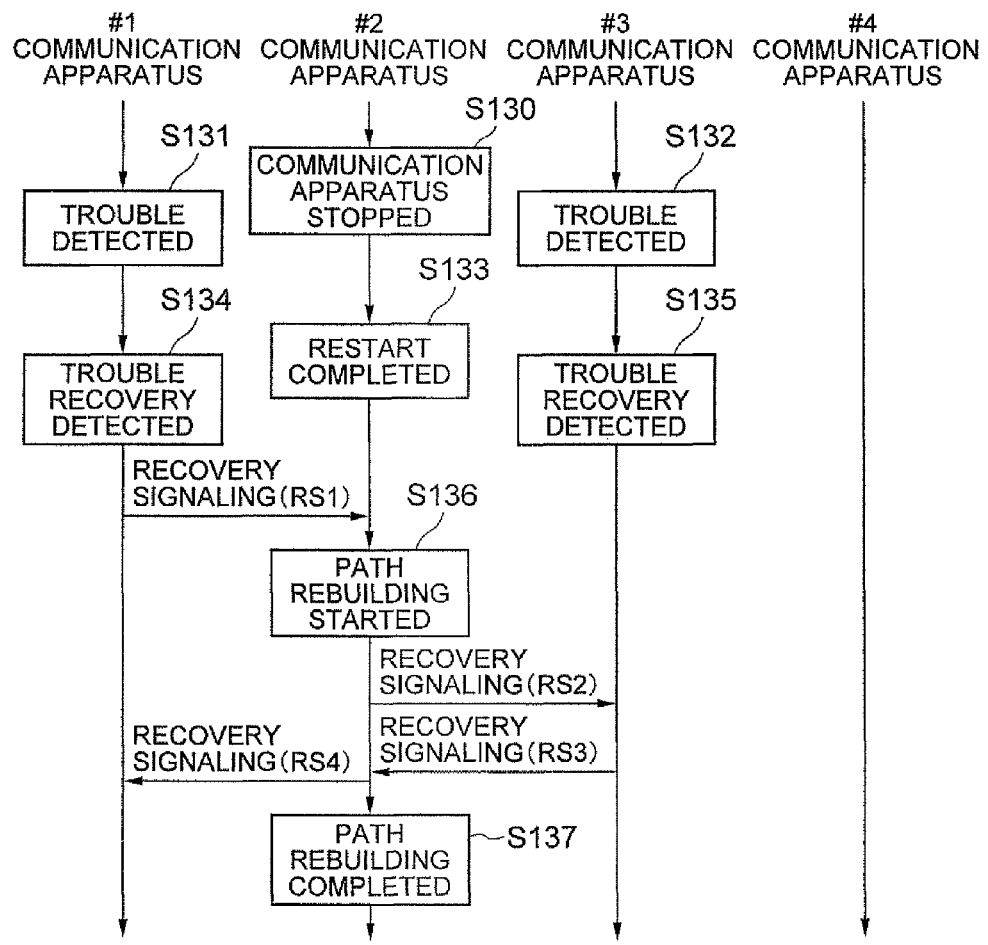
FIG. 14 is a sequence chart showing restart of the traditional communication apparatus.
Figure 14B:
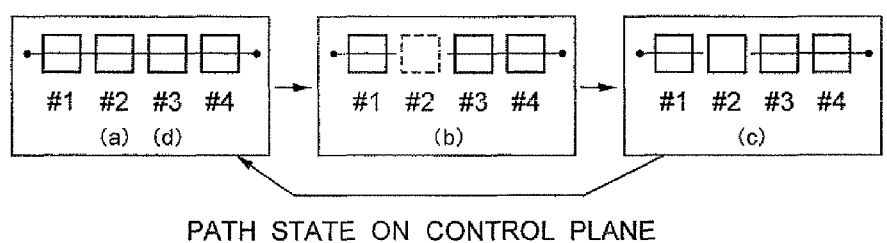
Figure 15A:
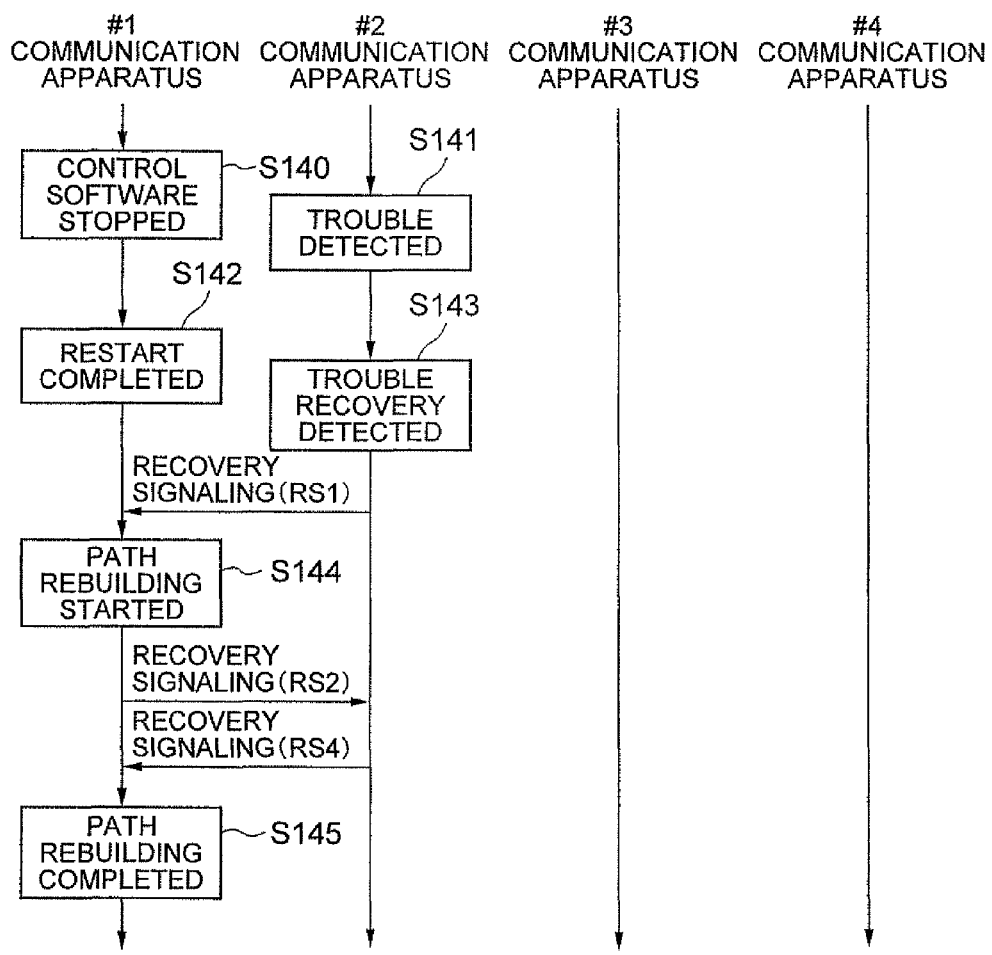
FIG. 15 is a sequence chart showing restart of the traditional communication apparatus.
Figure 15B:
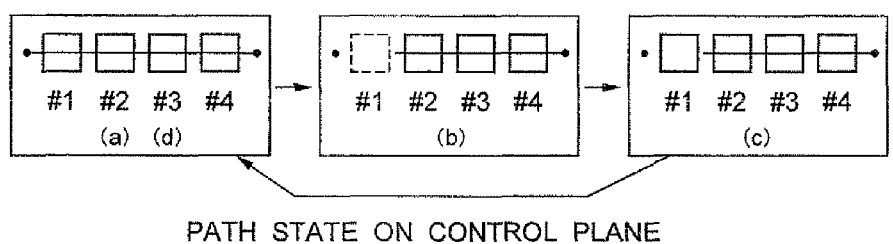
Figure 16:
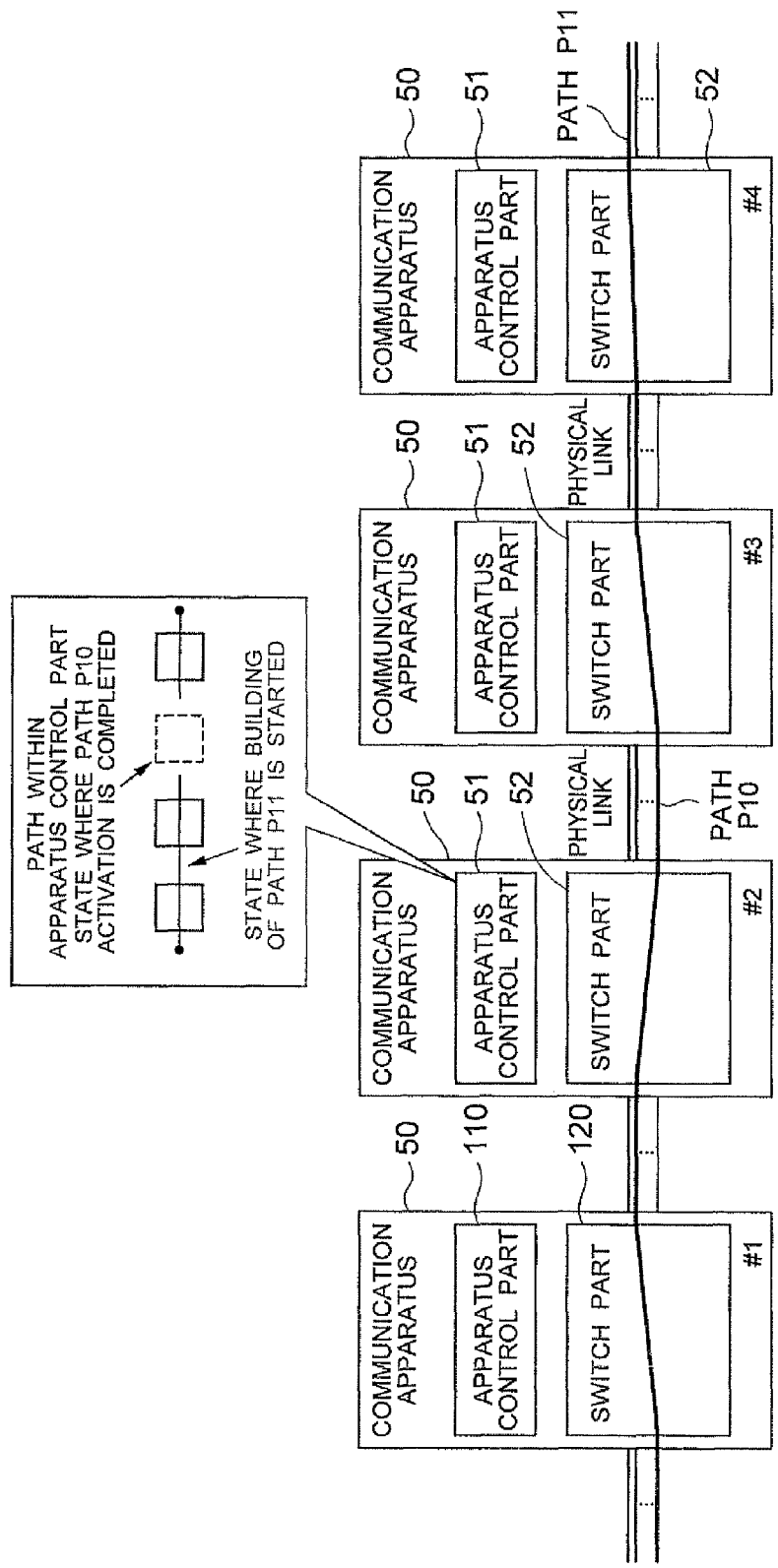
FIG. 16 is a block diagram showing a hierarchical relation which cannot be recovered at the time of restarting the traditional communication apparatus.
Figure 17:
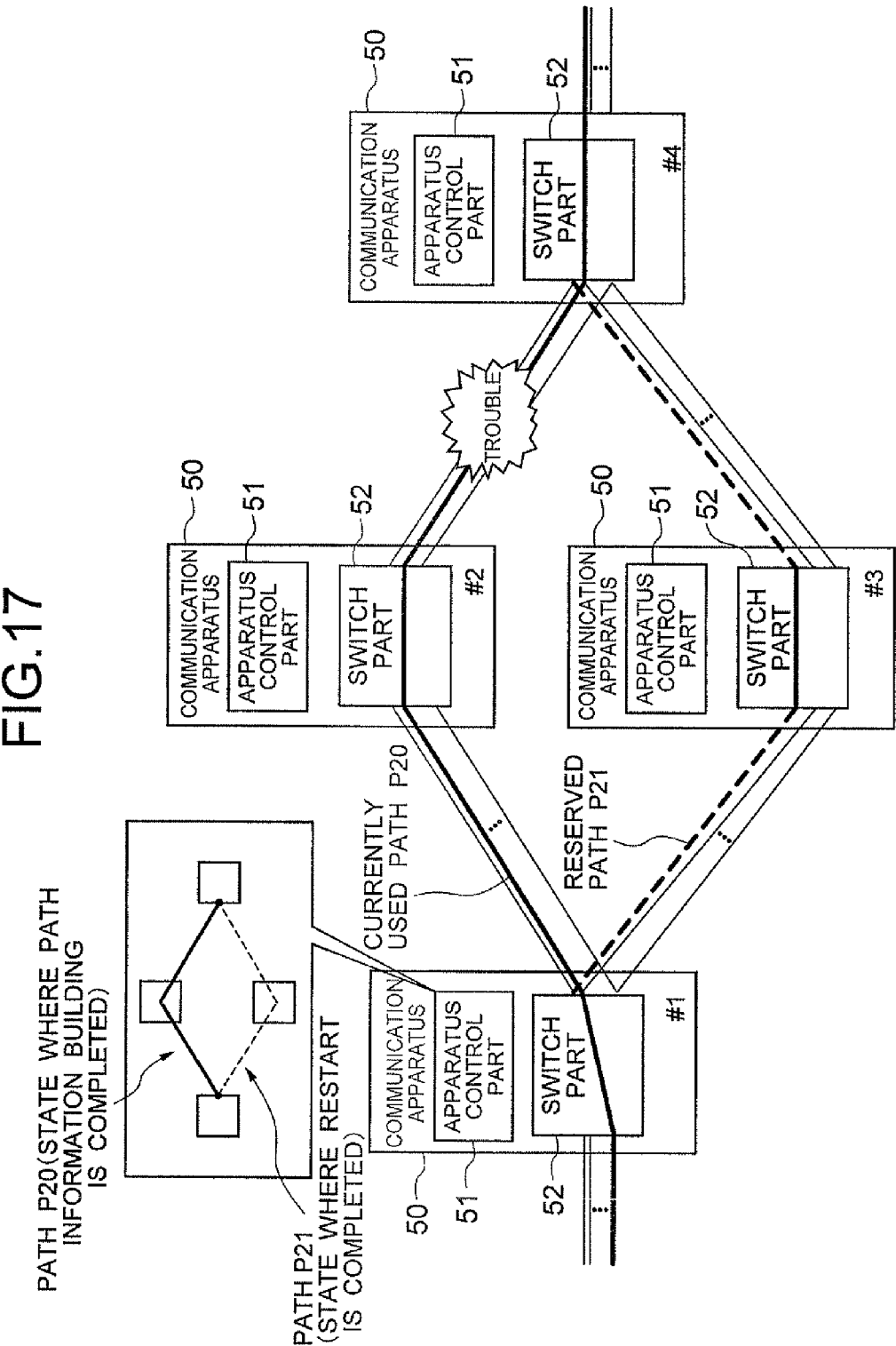
FIG. 17 is a block diagram showing a current-use/reserved-use relation which cannot be recovered by a restart procedure of the traditional communication apparatus.

10 Communication apparatus
11 Apparatus control part
12 Switch part
13 Main signal I/F part
30 Control software of apparatus control part
31 Control packet transmitting/receiving device
32 Routing protocol device
33 Signaling protocol device (held path information acquiring device, trouble information acquiring device, path switching request device)
34 Link managing protocol device
35 Path managing device
36 Resource managing device (link information generating device, path information generating device)
37 Path order control device (order determining device)
38 Logical I/F managing device 39 Information delaying device (concealed I/F information generating device, concealed logical I/F information generating device)
40 Control software of switch part
41 Switch managing device
42 I/F managing device (trouble information writing device, troubled path detecting device)
111 Protocol processing part
112 Volatile storing part
112a Path information list
112b Link information list
112c Topology information list
113 Nonvolatile storing part (path order defining information storing device, logical I/F information storing device)
113a Setting information list
113b Defining information list
114 Control I/F part
121 Hardware control part
122 Switch circuit part
123 Nonvolatile storing part (I/F information storing device, switch information storing device)
123a Switch information list
123b I/F information list
130 Main signal physical channel
P100, P200, P201 Path

The invention claimed is:

1. A communication apparatus comprising:
a switch part for switching passageways of traffic; and
an apparatus control part for controlling the switch part,
wherein the apparatus control part includes a protocol processing part operated by prescribed control software and a volatile storing part for saving information held at the protocol processing part; and the switch part comprises a control part for controlling a built-in switch circuit part according to a request from the apparatus control part and a nonvolatile storing part for storing a connection state of the built-in switch circuit part,
wherein the apparatus control part has a storing part for storing defining information for setting a priority order among paths to be recovered, and an order determining device for rebuilding a plurality of the paths sent from adjacent apparatuses to the protocol processing part in the order of priority defined by the defining information in the storing part, when the apparatus control part recovers from trouble, wherein:
the protocol processing part comprises an information delaying device which, when a trouble occurs, delays information of the trouble; and
the apparatus control part has a function of rebuilding, after starting the apparatus control part, path information of a plurality of paths stored in the volatile storing part, which is lost in restart of the apparatus control part or updating the control software, based on I/F information held at the nonvolatile storing part of the switch part, and information of the plurality of paths transmitted from the adjacent apparatuses, and has a function of notifying the trouble information delayed by the information delaying device to other adjacent apparatuses after completing the rebuilding, and of recovering the trouble.

2. A communication apparatus connected to a network having a hierarchical structure in which a higher layer path is subordinate to a lower layer path when rebuilding path information of the paths for transmitting user traffic, and connected to a control network which receives/transmits a control message, the communication apparatus comprising:
an I/F information storing device for storing I/F information that shows physical information of the paths, a switch information storing device for storing switch information that shows a state of switches connected to communication channels that configure the paths, and a path order defining information storing device for storing defining information for setting a priority order among paths to be recovered, when an apparatus control part recovers from trouble;
a link information generating device to generate link information of before restart for specifying adjacent communication apparatuses based on the I/F information stored in the I/F information storing device and the switch information stored in the switch information storing device, and a held path information acquiring device for acquiring held path information held by the adjacent communication apparatuses written in the link information that is generated by the link information generating device via the control network; and
an order determining device which determines the order of priority of the paths in such a manner that the lower layer path comes first and the higher layer path comes thereafter when generating the path information based on a priority order among paths to be recovered that is stored in the path order defining information storing device, when the held path information acquiring device acquires the held path information held by the adjacent communication apparatuses, and a path information generating device which generates the path information based on the order of priority of the paths determined by the order determining device and the held path information acquired by the held path information acquiring device.

3. The communication apparatus as claimed in claim 2, wherein the paths are processed by RSVP protocol.

4. A communication apparatus connected to a network having a hierarchical structure in which a higher layer path is subordinate to a lower layer path when rebuilding path information of the paths for transmitting user traffic, and connected to a control network which receives/transmits a control message, the communication apparatus comprising:
an I/F information storing device for storing I/F information that shows physical information of the paths; a switch information storing device for storing switch information that shows a state of switches connected to communication channels that configure the paths, and a logical I/F information storing device for storing logical I/F information that shows logical information of the paths;
a link information generating device to generate link information of before restart for specifying adjacent communication apparatuses based on the I/F information stored in the I/F information storing device, the logical I/F information stored in the logical I/F information storing device, and the switch information stored in the switch information storing device, a held path information acquiring device for acquiring the held path information held by the adjacent communication apparatuses written in the link information that is generated by the link information generating device via the control network; and
a path information generating device for generating the path information when the held path information acquiring device acquires the held path information, regardless of whether or not the lower layer path information is formed in advance.

5. The communication apparatus as claimed in claim 4, wherein the paths are processed by RSVP protocol.

6. The communication apparatus as claimed in claim 4, further comprising:
- a concealed I/F information generating device which, when trouble information is written to the I/F information stored in the I/F information storing device, rewrites the trouble information to a proper value to generate I/F information in which the trouble information is concealed; and
- a concealed logical I/F information generating device which, when trouble information is written to the logical I/F information stored in the logical I/F information storing device, rewrites the trouble information to a proper value to generate logical I/F information in which the trouble information is concealed, wherein
- the link information generating device generates link information of before the restart for specifying the adjacent communication apparatuses based on the concealed I/F information generated by the concealed I/F information generating device by rewriting the trouble information to the proper value, the concealed logical I/F information generated by the concealed logical I/F information generating device by rewriting the trouble information to a proper value, and the switch information stored in the switch information storing device.

7. The communication apparatus as claimed in claim 6, wherein the path information generated by the path information generating device contains path attribute information which shows attribute of a currently used path and attribute of a reserved path that is used when there is a trouble occurred in the currently used path, the communication apparatus further comprising:
- a trouble information acquiring device for acquiring, from adjacent communication apparatuses, trouble information that indicates occurrence of a communication trouble in the network;
- a trouble information writing device which writes the trouble information acquired by the trouble information acquiring device into the I/F information storing device, and writes the trouble information to information indicating that there is no trouble, when the path information is generated by the path information generating device;
- a troubled link specifying device which, after the path information is generated by the path information generating device, specifies information of the link where the trouble is generated based on the trouble information stored in the I/F information storing device, a troubled path detecting device for detecting the path that is affected by the trouble, from the link information specified by the troubled link specifying device; and
- a path switching request device which transmits, via the control network, a path switching request for switching the currently used path to the reserved path to the adjacent communication apparatus that is connected to the path where the trouble detected by the troubled path detecting device occurred.

8. A communication control method which, when rebuilding path information of a path that transmits user traffic, controls to transmit the user traffic to a network that has a hierarchical structure in which a higher layer path is subordinate to a lower layer path, and allows each communication apparatus to control transmission/reception of a control message between the communication apparatuses via a control network, said communication control method comprising:
- generating link information of before restart for specifying adjacent communication apparatuses based on I/F information for showing physical information of the paths and switch information indicating a state of switches connected to communication channels that configure the paths;
- acquiring held path information from the adjacent communication apparatuses written in the generated link information via the control network;
- determining a priority order of the paths in such a manner that the lower layer path comes first and the higher layer path comes thereafter based on order defining information for defining a priority order for recovering the path information when the path information of a plurality of paths is lost; and
- rebuilding the path information based on the determined priority order and the held path information.

9. The communication control method as claimed in claim 8, wherein the paths are processed by RSVP protocol.

10. A communication control method which, when rebuilding path information of a path that transmits user traffic, controls to transmit the user traffic to a network that has a hierarchical structure in which a higher layer path is subordinate to a lower layer path and controls to transmit/receive a control message between each of communication apparatuses via a control network, said communication control method comprising:
- generating link information of before the restart for specifying adjacent communication apparatuses based on I/F information for showing physical information of the paths, logical I/F information indicating logical information of the paths, and switch information indicating a state of switches connected to communication channels that configure the paths;
- acquiring held path information from the adjacent communication apparatuses written in the generated link information via the control network; and
- rebuilding generates the path information, regardless of whether or not a lower layer path information is formed in advance.

11. The communication control method as claimed in claim 10, wherein the paths are processed by RSVP protocol.

12. The communication control method as claimed in claim 10, which:
- when trouble information is written in the I/F information, rewrites the trouble information to a normal value to generate I/F information in which the trouble information is concealed;
- when trouble information is written in the logical I/F information, rewrites the trouble information to a normal value to generate logical I/F information in which the trouble information is concealed; and
- generates link information of before the restart for specifying adjacent communication apparatuses based on the I/F information in which the trouble information is rewritten to the normal value to conceal it, the logical I/F information in which the trouble information is rewritten to the normal value to conceal it, and the switch information.

13. The communication control method as claimed in claim 12, wherein the rebuilt path information contains path attribute information which shows attribute of a currently used path and attribute of a reserved path that is used when there is a trouble occurred in the currently used path, the communication control method being configured to:
- acquire, from adjacent communication apparatuses, trouble information indicating that there is an occurrence of a communication trouble in the network;

specify information of a link where the trouble is generated, based on the acquired trouble information;

detect the path that is affected by the trouble from the specified link information; and transmit, via the control network, a request for switching the currently used path to the reserved path to the adjacent communication apparatus that is connected to the path where the detected trouble occurred.

14. A non-transitory computer readable medium having stored thereon a communication control program which, when rebuilding path information of a path for transmitting user traffic, controls transmission of the user traffic to a network that has a hierarchical structure in which a higher layer path is subordinate to a lower layer path, and allows each communication apparatus to control transmission/reception of a control message between the communication apparatuses via a control network, the non-transitory computer readable medium enabling a computer to execute:

a procedure for generating link information of before the restart for specifying all adjacent communication apparatuses based on I/F information for showing physical information of the paths, and switch information showing a state of switches connected to communication channels that configure the paths;

a procedure for acquiring, via the control network, held path information from the adjacent communication apparatuses that are written in the generated link information;

a procedure for determining a priority order of the paths in such a manner that a lower layer path comes first and a higher layer path comes thereafter when generating the path information based on order defining information for defining a priority order of the paths with which path information is to be recovered when the path information of a plurality of paths is lost; and a procedure for rebuilding the path information based on the determined priority order and the held path information acquired earlier.

15. The non-transitory computer readable medium as claimed in claim 14, wherein the paths are processed by RSVP protocol.

16. A non-transitory computer readable medium having stored thereon communication control program which, when rebuilding path information of a path for transmitting user traffic, controls transmission of the user traffic to a network that has a hierarchical structure in which a higher layer path is subordinate to a lower layer path, and allows each communication apparatus to control transmission/reception of a control message between the communication apparatuses via a control network, the non-transitory computer readable medium enabling a computer to execute:

a procedure for generating link information of before the restart for specifying adjacent communication apparatuses based on I/F information for showing physical information of the paths, logical I/F information for showing logical information of the paths, and the switch information stored in advance for showing a state of switches connected to communication channels that configure the paths;

a procedure for acquiring, via the control network, held path information from the adjacent communication apparatuses that are written in the generated link information; and a procedure for generating the path information, regardless of whether or not a lower layer path information is formed in advance.

17. The non-transitory computer readable medium as claimed in claim 16, wherein the paths are processed by RSVP protocol.

18. A communication apparatus connected to a network having a hierarchical structure in which a higher layer path is subordinate to a lower layer path when rebuilding path information of the paths for transmitting user traffic, and connected to a control network which receives/transmits a control message, the communication apparatus comprising:

an I/F information storing means for storing I/F information that shows physical information of the paths, a switch information storing means for storing switch information that shows a state of switches connected to communication channels that configure the paths, and a path order defining information storing means for storing defining information for setting a priority order among paths to be recovered, when an apparatus control means recovers from trouble;

a link information generating means to generate link information of before restart for specifying adjacent communication apparatuses based on the I/F information stored in the I/F information storing means and the switch information stored in the switch information storing means, and a held path information acquiring means for acquiring held path information held by the adjacent communication apparatuses written in the link information that is generated by the link information generating means via the control network; and an order determining means which determines the order of priority of the paths in such a manner that the lower layer path comes first and the higher layer path comes thereafter when generating the path information based on a priority order among paths to be recovered that is stored in the path order defining information storing means, when the held path information acquiring means acquires the held path information held by the adjacent communication apparatuses, and a path information generating means which generates the path information based on the order of priority of the paths determined by the order determining means and the held path information acquired by the held path information acquiring means.

19. A communication apparatus connected to a network having a hierarchical structure in which a higher layer path is subordinate to a lower layer path when rebuilding path information of the paths for transmitting user traffic, and connected to a control network which receives/transmits a control message, the communication apparatus comprising:

an I/F information storing means for storing I/F information that shows physical information of the paths; a switch information storing means for storing switch information that shows a state of switches connected to communication channels that configure the paths, and a logical I/F information storing means for storing logical I/F information that shows logical information of the paths;

a link information generating means to generate link information of before restart for specifying adjacent communication apparatuses based on the I/F information stored in the I/F information storing means, the logical I/F information stored in the logical I/F information storing means, and the switch information stored in the switch information storing means, a held path information acquiring means for acquiring the held path information held by the adjacent communication apparatuses written in the link information that is generated by the link information generating means via the control network; and a path information generating means for generating the path information when the held path information acquiring means acquires the held path information, regardless of whether or not the lower layer path information is formed in advance.

* * * * *